United States Patent
Maturana et al.

(10) Patent No.: US 9,990,596 B2
(45) Date of Patent: *Jun. 5, 2018

(54) CLOUD-BASED GLOBAL ALARM ANNUNCIATION SYSTEM FOR INDUSTRIAL SYSTEMS

(71) Applicant: Rockwell Automation Technologies, Inc., Mayfield Heights, OH (US)

(72) Inventors: Francisco P. Maturana, Lyndhurst, OH (US); Juan L. Asenjo, Timberlake, OH (US); Salvatore T. Conti, Olmsted Township, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/431,128

(22) Filed: Feb. 13, 2017

(65) Prior Publication Data

US 2017/0154298 A1 Jun. 1, 2017

Related U.S. Application Data

(63) Continuation of application No. 14/665,128, filed on Mar. 23, 2015, now Pat. No. 9,614,963.

(Continued)

(51) Int. Cl.
*H04M 3/42* (2006.01)
*G06Q 10/06* (2012.01)
(Continued)

(52) U.S. Cl.
CPC ... *G06Q 10/063112* (2013.01); *G05B 19/058* (2013.01); *G06F 9/5072* (2013.01); *G05B 2219/14005* (2013.01)

(58) Field of Classification Search
CPC .......... G06Q 10/063112; G05B 19/058; G05B 2219/14005; G06F 9/5072
(Continued)

(56) References Cited

U.S. PATENT DOCUMENTS

| | | |
|---|---|---|
| 5,519,605 A | 5/1996 | Cawlfield |
| 6,230,010 B1 | 5/2001 | Morris |

(Continued)

FOREIGN PATENT DOCUMENTS

| | | |
|---|---|---|
| CN | 1755564 | 4/2006 |
| CN | 1937559 | 3/2007 |

(Continued)

OTHER PUBLICATIONS

Chinese Office Action and English Translation thereof dated Jul. 12, 2017, for Chinese Application Serial No. 201510138210.1, 17 pages.

(Continued)

*Primary Examiner* — Quynh Nguyen
(74) *Attorney, Agent, or Firm* — Amin, Turocy & Watson, LLP

(57) ABSTRACT

A cloud-based global alarm annunciation broker assist in locating and contacting suitable technical support personnel in response to detected alarm events at a plant facility. The system comprises a cloud-based framework that dynamically matches on-site alarm events to domain experts capable of addressing the alarm events. The framework uses an agent-based architecture to gather industrial data from data sources within the industrial environment, including time-series alarm data. The data is received at a cloud platform, where broker services perform a global search for suitable technical support resources in response to alarm events identified by the collected data. The brokering system can automatically generate service tickets and send notifi- (Continued)

cations to both end users and system managers/supervisors, and can notify application-level experts about events and anomalies that emerge from the on-premise processes being monitored by the cloud-based broker system.

20 Claims, 18 Drawing Sheets

Related U.S. Application Data

(60) Provisional application No. 61/970,798, filed on Mar. 26, 2014.

(51) Int. Cl.
*G05B 19/05* (2006.01)
*G06F 9/50* (2006.01)

(58) Field of Classification Search
USPC .................. 379/201.01, 265.12; 709/248
See application file for complete search history.

(56) References Cited

U.S. PATENT DOCUMENTS

| | | |
|---|---|---|
| 6,609,034 B1 | 8/2003 | Behrens et al. |
| 6,640,241 B1 | 10/2003 | Ozzie et al. |
| 6,675,226 B1 | 1/2004 | Nair et al. |
| 7,133,908 B1 | 11/2006 | Pajak et al. |
| 7,159,209 B1 | 1/2007 | Srinivasan et al. |
| RE39,989 E | 1/2008 | Morris |
| 7,676,287 B2 | 3/2010 | Eryurek et al. |
| 8,219,216 B2 | 7/2012 | Klug et al. |
| 8,275,847 B2 | 9/2012 | Lewis |
| 2001/0053992 A1 | 12/2001 | Eto et al. |
| 2002/0133270 A1 | 9/2002 | Hung et al. |
| 2002/0178159 A1 | 11/2002 | O'Brien |
| 2003/0014387 A1 | 1/2003 | Kreidler et al. |
| 2003/0083754 A1 | 5/2003 | Tripathi et al. |
| 2003/0212818 A1 | 11/2003 | Klein et al. |
| 2004/0141517 A1 | 7/2004 | Balasubramanian et al. |
| 2004/0230859 A1 | 11/2004 | Cochran et al. |
| 2005/0010333 A1 | 1/2005 | Lorton et al. |
| 2005/0154477 A1 | 7/2005 | Martin et al. |
| 2005/0193285 A1 | 9/2005 | Jeon |
| 2006/0068762 A1 | 3/2006 | Baldwin et al. |
| 2006/0294047 A1 | 12/2006 | Johnston et al. |
| 2007/0019641 A1 | 1/2007 | Pai et al. |
| 2008/0027704 A1 | 1/2008 | Kephart et al. |
| 2008/0168092 A1 | 7/2008 | Boggs et al. |
| 2008/0317058 A1 | 12/2008 | Williams |
| 2009/0089227 A1 | 4/2009 | Sturrock et al. |
| 2009/0183201 A1 | 7/2009 | Dasgupta |
| 2009/0198350 A1 | 8/2009 | Thiele |
| 2009/0265036 A1 | 10/2009 | Jamieson et al. |
| 2009/0326892 A1 | 12/2009 | Lin |
| 2010/0070852 A1 | 3/2010 | Li |
| 2010/0256794 A1 | 10/2010 | McLaughlin et al. |
| 2010/0256795 A1 | 10/2010 | McLaughlin et al. |
| 2010/0257228 A1 | 10/2010 | Staggs et al. |
| 2011/0066298 A1 | 3/2011 | Francino et al. |
| 2011/0103393 A1 | 5/2011 | Meier et al. |
| 2011/0134930 A1 | 6/2011 | McLaren et al. |
| 2011/0145836 A1 | 6/2011 | Wheeler et al. |
| 2011/0264622 A1 | 10/2011 | Vargas et al. |
| 2012/0143378 A1 | 6/2012 | Spears et al. |
| 2012/0144202 A1 | 6/2012 | Counterman |
| 2012/0166963 A1 | 6/2012 | Kohli et al. |
| 2012/0232869 A1 | 9/2012 | Maturana et al. |
| 2012/0331104 A1 | 12/2012 | Akiyama et al. |
| 2013/0067090 A1 | 3/2013 | Batrouni et al. |
| 2013/0081146 A1 | 3/2013 | Hakozaki |
| 2013/0110298 A1 | 5/2013 | Beveridge |
| 2013/0123965 A1 | 5/2013 | Cooper et al. |
| 2013/0124253 A1 | 5/2013 | Cooper et al. |
| 2013/0150986 A1 | 6/2013 | Timsjo et al. |
| 2013/0191106 A1 | 7/2013 | Kephart et al. |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0225151 A1 | 8/2013 | King et al. |
| 2013/0227446 A1 | 8/2013 | Zala et al. |
| 2013/0262678 A1 | 10/2013 | Tung et al. |
| 2013/0266193 A1 | 10/2013 | Tiwari et al. |
| 2013/0269020 A1 | 10/2013 | Griffin et al. |
| 2013/0283151 A1 | 10/2013 | Deguzman et al. |
| 2013/0290952 A1 | 10/2013 | Childers, Jr. |
| 2014/0047107 A1 | 2/2014 | Maturana et al. |
| 2014/0147064 A1 | 2/2014 | Maturana et al. |
| 2014/0115592 A1 | 4/2014 | Frean et al. |
| 2014/0156234 A1 | 6/2014 | Maturana et al. |
| 2014/0164124 A1 | 6/2014 | Rhoads |
| 2014/0207868 A1 | 7/2014 | Gordon et al. |
| 2014/0257528 A1 | 9/2014 | Perez et al. |
| 2014/0269531 A1 | 9/2014 | Luna et al. |
| 2014/0274005 A1 | 9/2014 | Luna et al. |
| 2014/0280796 A1 | 9/2014 | Pijewski |
| 2014/0282015 A1 | 9/2014 | Nixon et al. |
| 2014/0337473 A1 | 11/2014 | Frusina et al. |
| 2015/0220080 A1 | 8/2015 | Nixon et al. |

FOREIGN PATENT DOCUMENTS

| | | |
|---|---|---|
| CN | 103293953 | 9/2013 |
| CN | 203466840 | 3/2014 |
| CN | 103701953 A | 4/2014 |
| EP | 1422619 | 5/2004 |
| EP | 2228965 | 9/2010 |
| EP | 2541354 | 1/2013 |
| EP | 2592812 | 5/2013 |
| EP | 2660667 | 11/2013 |
| EP | 2704401 | 3/2014 |

OTHER PUBLICATIONS

Final Office Action for U.S. Appl. No. 14/562,233, dated Jul. 28, 2017, 33 pages.
Final Office Action for U.S. Appl. No. 14/639,279, dated Aug. 9, 2017, 66 pages.
Office Action for U.S. Appl. No. 14/525,149 dated Oct. 5, 2017, 88 pages.
Office Action for U.S. Appl. No. 14/525,144, dated Feb. 3, 2017, 42 pages.
Office Action for U.S. Appl. No. 14/525,149, dated Feb. 27, 2017, 76 pages.
Office Action for U.S. Appl. No. 14/634,174, dated Feb. 3, 2017, 12 pages.
Office Action for U.S. Appl. No. 14/634,174, dated Aug. 4, 2016, 11 pages.
Office Action for U.S. Appl. No. 14/525,131, dated Jun. 28, 2016, 36 pages.
Office Action for U.S. Appl. No. 14/665,128, dated Jul. 20, 2016, 9 pages.
Office Action from U.S. Appl. No. 14/525,144, dated Sep. 9, 2016, 28 pages.
Extended European Search Report for EP Application Serial No. 15160984.9, dated Jul. 4, 2016, 10 pages.
European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.

(56) References Cited

OTHER PUBLICATIONS

Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
"Steiner, J. G., et al., ""Kerberos: An Authentication Service for Open Network Systems,"" Proceedings of the Winter UsenixConference, Feb. 9, 1988, pp. 191-202."
Extended European Search Report for EP Application Serial No. 15160989.8, dated Sep. 22, 2016, 5 pages.
Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
Office Action for U.S. Appl. No. 14/525,131, dated Oct. 4, 2016, 56 pages.
Office Action for U.S. Appl. No. 14/634,174, dated Nov. 4, 2016, 25 pages.
European Office Action for EP Application Serial No. 15160988.0, dated Oct. 24, 2016, 2 pages.
Office Action for U.S. Appl. No. 14/562,233, dated Jan. 25, 2017, 25 pages.
Office Action for U.S. Appl. No. 14/639,279, dated Feb. 10, 2017, 110 pages.
Office Action for U.S. Appl. No. 14/525,131, dated Feb. 3, 2017, 21 pages.
Office Action for Chinese Application No. 201510136419.4, dated Apr. 21, 2017, 10 pages.
Office Action for Chinese Application No. 201510135130.0, dated May 3, 2017, 15 pages.
Office Action for U.S. Appl. No. 14/478,974, dated Jun. 15, 2017, 11 pages.
Office Action for U.S. Appl. No. 14/619,933 dated May 15, 2017, 11 pages.
Office Action for Chinese Application No. 201510138371.0 dated May 4, 2017, 15 pages.
Final Office Action for U.S. Appl. No. 14/525,149, dated Jul. 7, 2017, 77 pages.
Office Action for U.S. Appl. No. 14/639,279 dated Nov. 15, 2017, 75 pages.
Office Action for U.S. Appl. No. 14/562,233 dated Dec. 29, 2017, 36 pages.
Office Action for Chinese Application Serial No. 201510138371.0 dated Nov. 14, 2017, 5 pages.
European Office Action for European Application Serial No. 15160984.9 dated Feb. 15, 2018, 7 pages.
European Office Action for European Application Serial No. 15160924.5, dated Feb. 8, 2018, 5 pages.
European Office Action for European Application Serial No. 15160944.3, dated Feb. 15, 2018, 7 pages.
European Office Action for European Application Serial No. 15160980.7, dated Feb. 15, 2018, 8 pages.
European Office Action for European Application Serial No. 15160987.2, dated Feb. 12, 2018, 7 pages.
European Office Action for European Application Serial No. 15160988.0, dated Feb. 9, 2018, 5 pages.

| Application ID | Description | Time Stamp | Time Zone | Technology | Status | Mode | Filter Key |
|---|---|---|---|---|---|---|---|
| Application ID | Description | Time Stamp | Time Zone | Technology | Status | Mode | Filter Key |
| Application ID | Description | Time Stamp | Time Zone | Technology | Status | Mode | Filter Key |
| Application ID | Description | Time Stamp | Time Zone | Technology | Status | Mode | Filter Key |
| Application ID | Description | Time Stamp | Time Zone | Technology | Status | Mode | Filter Key |
| Application ID | Description | Time Stamp | Time Zone | Technology | Status | Mode | Filter Key |

HARMONIZATION

CLOUD-BASED GLOBAL ALARM ANNUNCIATION SYSTEM FOR INDUSTRIAL SYSTEMS

CROSS-REFERENCE TO RELATED APPLICATIONS

This application is a continuation of, and claims priority to, U.S. patent application Ser. No. 14/665,128, filed on Mar. 23, 2015, and entitled "CLOUD-BASED GLOBAL ALARM ANNUNCIATION SYSTEM FOR INDUSTRIAL SYSTEMS," which claims priority to U.S. Provisional Application Ser. No. 61/970,798, filed on Mar. 26, 2014, and entitled "INDUSTRIAL CLOUD INFRASTRUCTURE FOR DATA INGESTION, MODELING, PROCESSING, ANALYTICS, AND REPORTING." The entireties of these related applications are incorporated herein by reference.

BACKGROUND

The subject matter disclosed herein relates generally to industrial automation, and, more particularly, a cloud-based architecture that matches industrial alarm events with qualified technical experts using a global search framework.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for notification of industrial alarm events is provided, a device interface configured to receive, at a cloud platform, a data packet from a cloud agent device residing at an industrial facility, wherein the data packet comprises an alarm record identifying an alarm event associated with an industrial system; a search component configured to identify one or more technical experts based on information included in the alarm record; and a user interface component configured to send notification information to one or more client devices associated with the one or more technical experts, the notification information requesting assistance in resolving the alarm event.

Also, one or more embodiments provide a method for matching industrial alarm events with technical experts, comprising receiving, at a cloud platform by a system comprising at least one processor, a data packet from a cloud agent device that monitors an industrial process, wherein the data packet comprises an alarm record that identifies an alarm event associated with the industrial process; identifying, by the system, a subset of technical experts defined in an expert data store based on a comparison of the expert data with the alarm record; and sending, by the system, notification data to one or more client devices associated with the subset of technical experts, wherein the notification data comprises a request for support in connection with the alarm event.

Also, according to one or more embodiments, a non-transitory computer-readable medium is provided having stored thereon instructions that, in response to execution, cause a system to perform operations, the operations, comprising receiving, at a cloud platform, an alarm record from a cloud agent device that monitors alarm events at an industrial facility, wherein the alarm record identifies an alarm event associated with an industrial device; searching expert data maintained in cloud-based expert data storage based on the alarm record, wherein the expert data comprises information relating to a set of technical experts; identifying a subset of the technical experts determined to be capable of assisting with the alarm event based on a comparison of the expert data with the alarm record; and sending, via the cloud platform, notification information to one or more client devices associated with the subset of technical experts, wherein the notification information comprises a request for assistance in resolving the alarm event.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 7 is an example format for a harmonized alarm list comprising a list of alarm records.

DETAILED DESCRIPTION

Figure 1:
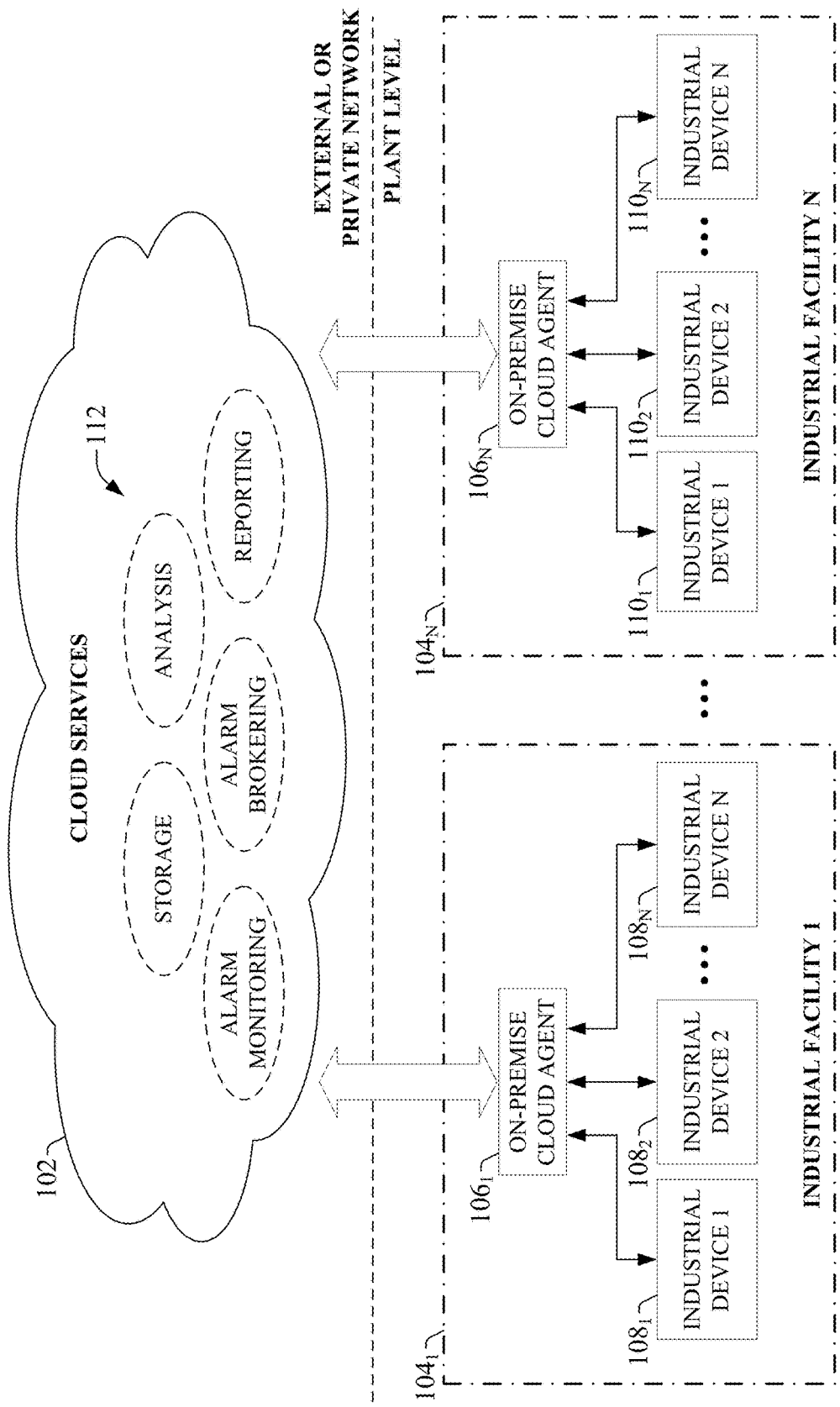
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e g, manually entered reason codes associated with a downtime condition), electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

Industrial automation systems that make up a given industrial enterprise are typically maintained by on-site plant personnel (e.g., maintenance personnel, plant engineers, etc.). Given the diversity and complexity of industrial assets that make up a given industrial system, many device or system maintenance issues require a level of specialized device expertise not possessed by on-site maintenance personnel, who may be responsible for a wide range of disparate industrial assets and therefore possess a more generalized knowledge of their assets. Consequently, industrial enterprises generally rely, to varying degrees, on outside expert support personnel for assistance with certain technical support issues.

Maintenance personnel wishing to obtain technical assistance to resolve a device failure, a performance issue, or an alarm incident must typically contact a remote technical support person by phone and provide relevant information about their particular industrial device, software, system configuration, etc. Providing the technical support personnel with a complete set of relevant information required to resolve a maintenance issue sometimes requires a level of knowledge about the customer's system that on-site plant personnel may not possess. Moreover, on-premise maintenance personnel may not know the correct technical support person for assistance in solving a particular alarm incident. This is a particular problem in the case of custom-built industrial systems, which are often designed and built by original equipment manufacturers (OEMs) using devices supplied by a separate equipment vendor (e.g., industrial controllers, motor drives, etc.). Consequently, the most suitable technical support entity for addressing a particular performance issue or abnormality with the custom machine may not always be clear to the machine owner.

To address these and other issues, one or more embodiments of the present disclosure provide a cloud-based global alarm annunciation broker (GAAB) system that assists in locating and contacting suitable technical support personnel in response to detected alarm incidents at a plant facility. The system comprises a cloud-based framework that dynamically matches on-site alarm events to domain expertise (experts, contractors, etc.) capable of addressing the alarm events. In one or more embodiments, the broker system uses an agent-based architecture to gather industrial data from data sources within an industrial environment, including but not limited to industrial devices (e.g., controllers, drives, telemetry devices, etc.), data historians, data tables, business-level systems (e.g. enterprise resource planning systems, manufacturing execution systems, accounting systems, etc.), and other such data sources. Among other types of data, the on-premise cloud agents can gather time-series alarm data from one or more industrial devices or machines. The alarm data is pushed to a cloud platform, where broker services harmonize the alarm data to a common schema by adding a harmonization envelope to the data. The broker system can analyze the harmonized alarm data to identify incoming alarm incidents that may require outside technical assistance, and perform a global search for a suitable technical support resource matching the particular incident. The broker system can identify suitable technical experts based in part on system- and expert-level information provided to the system. In some embodiments, the brokering mechanism can automatically generate tickets and send notifications to both end users (e.g., equipment owners) and system managers/supervisors, and can notify application-level experts about events and anomalies that emerge from the on-premise processes being monitored by the cloud-based broker system. The GAAB system described herein allows alarm notifications across many different applications to be handled and viewed in a consistent manner.

The alarm annunciation broker system is designed to execute as a service or set of services on a cloud platform. FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices 108 and 110 may also be part of a mobile control application, such as a system contained in a truck or other service vehicle.

According to one or more embodiments, on-premise cloud agents 106 can collect data from industrial devices 108 and 110—or from other data sources, including but not limited to data historians, business-level systems, etc.—and send this data to cloud platform 102 for processing and storage. Cloud platform 102 can be any infrastructure that allows cloud services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 (such as the alarm annunciation brokering system described herein) can reside and execute on the cloud platform 102 as a cloud-based service. In some such configurations, access to the cloud platform 102 and the services 112 can be provided to customers as a subscription service by an owner of the services 112. Alternatively, cloud platform 102 can be a private or semi-private cloud operated internally by the enterprise, or a shared or corporate cloud environment. An exemplary private cloud can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of real-time system data or other factors), alarm monitoring and expertise brokering services, visualization applications such as the cloud-based operator interface system described herein, reporting applications, Enterprise Resource Planning (ERP) applications, notification services, or other such applications. Cloud platform 102 may also include one or more object models to facilitate data ingestion and processing in the cloud. If cloud platform 102 is a web-based cloud, cloud agents 106 at the respective industrial facilities 104 may interact with cloud services 112 directly or via the Internet. In an exemplary configuration, the industrial devices 108 and 110 connect to the on-premise cloud agents 106 through a physical or wireless local area network or radio link. In another exemplary configuration, the industrial devices 108 and 110 may access the cloud platform 102 directly using integrated cloud agents.

Ingestion of industrial device data in the cloud platform 102 through the use of cloud agents 106 can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. Cloud agents 106 can be configured to automatically detect and communicate with the cloud platform 102 upon installation at any facility, simplifying integration with existing cloud-based data storage, analysis, or reporting applications used by the enterprise. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud based control applications can perform remote decision-making for a controlled industrial system based on data collected in the cloud from the industrial system, and issue control commands to the system via the cloud agent. These industrial cloud-computing applications are only intended to be exemplary, and the systems and methods described herein are not limited to these particular applications. The cloud platform 102 can allow software vendors to provide software as a service, removing the burden of software maintenance, upgrading, and backup from their customers.

Figure 2:
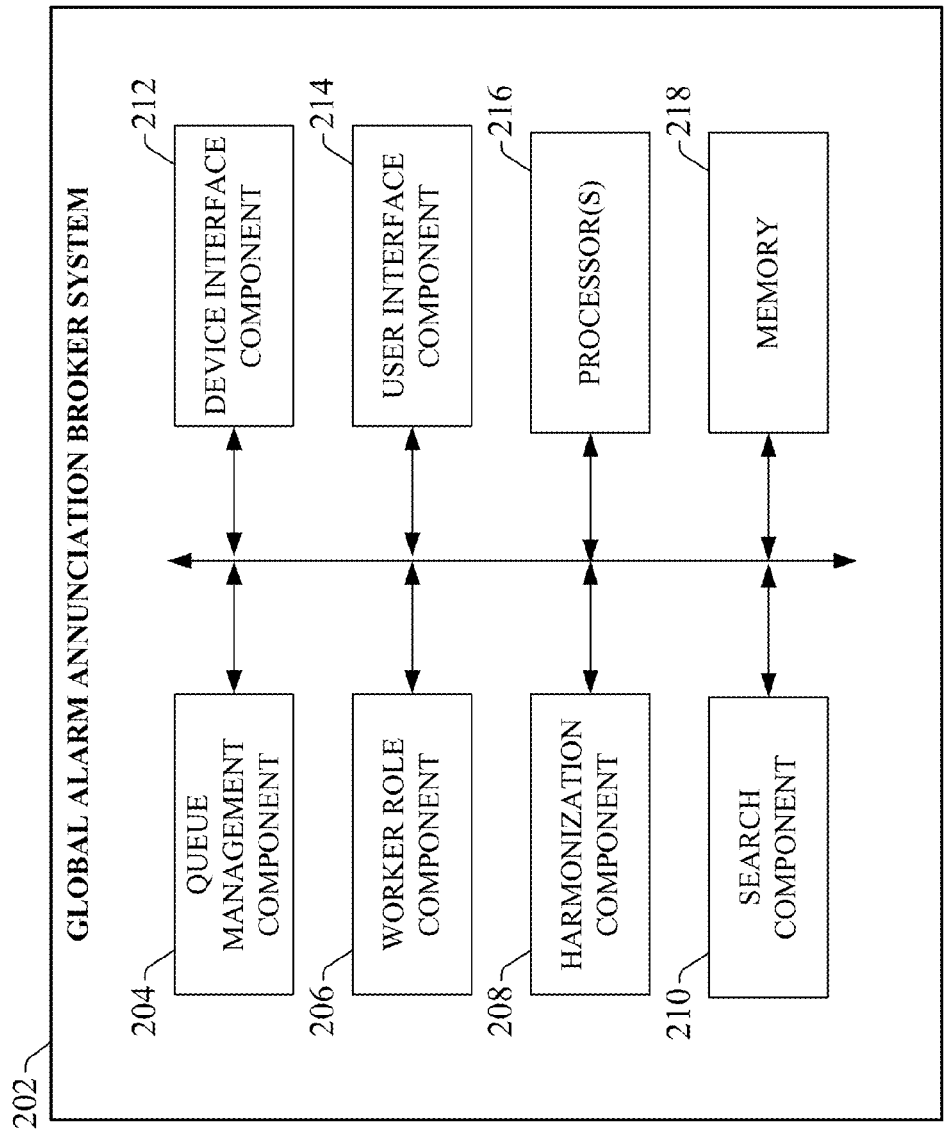
FIG. 2 is a block diagram of an example global alarm annunciation broker system.

FIG. 2 is a block diagram of an example global alarm annunciation broker (GAAB) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Global alarm annunciation broker system 202 can include a queue management component 204, a worker role component 206, a harmonization component 208, a search component 210, a device interface component 212, a user interface component 214, one or more processors 216, and memory 218. In various embodiments, one or more of the queue management component 204, worker role component 206, harmonization component 208, search component 210, device interface component 212, user interface component 214, the one or more processors 216, and memory 218 can be electrically and/or communicatively coupled to one another to perform one or more of the functions of the global alarm annunciation broker system 202. In some embodiments, components 204, 206, 208, 210, 212, and 214 can comprise software instructions stored on memory 218 and executed by processor(s) 216. Global alarm annunciation system 202 may also interact with other hardware and/or software components not depicted in FIG. 2. For example, processor(s) 216 may interact with one or more external user interface devices, such as a keyboard, a mouse, a display monitor, a touchscreen, or other such interface devices.

Queue management component 204 can be configured to receive compressed data packets from one or more cloud agents residing at an industrial facility and organize the industrial data contained in the packets into priority queues that respectively define how the data packets are to be processed by cloud processing services. The industrial data contained in the packets can include, for example, data relating to alarm events generated by industrial machines and/or devices on the plant floor. The worker role component 206 can be configured to process the data received in the data packets to facilitate matching alarm events to suitable technical experts capable of assisting in resolving the alarm event. Processing performed by the worker role component 206 can include, but is not limited to, organization and management of incoming alarm information, and pre-processing of alarm information prior to searching for suitable technical resources.

The harmonization component 208 can be configured to apply a harmonization envelop to incoming alarm records, thereby normalizing alarm records from multiple different sources so that the alarms can be processed in a consistent manner by the broker system 202. The search component 210 can be configured to perform a search for one or more suitable technical support experts capable of assisting with a particular alarm event. The device interface component 212 can be configured to receive the data packets from one or more cloud agent devices residing at one or more plant facilities. The user interface component 214 can be configured to exchange information between the broker system 202 and a client device associated with a technical expert, a system manager, a supervisor, or another authorized user of the broker system. To this end, the user interface component 214 can be configured to serve user interface screens to the client device that allow the user to view information stored or generated by the broker system 202 (e.g., alarm status information, expert information, alarm service histories, etc.) and to send information to the broker system 202 (e.g., service acknowledgements, availability information, contract information, etc.).

The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
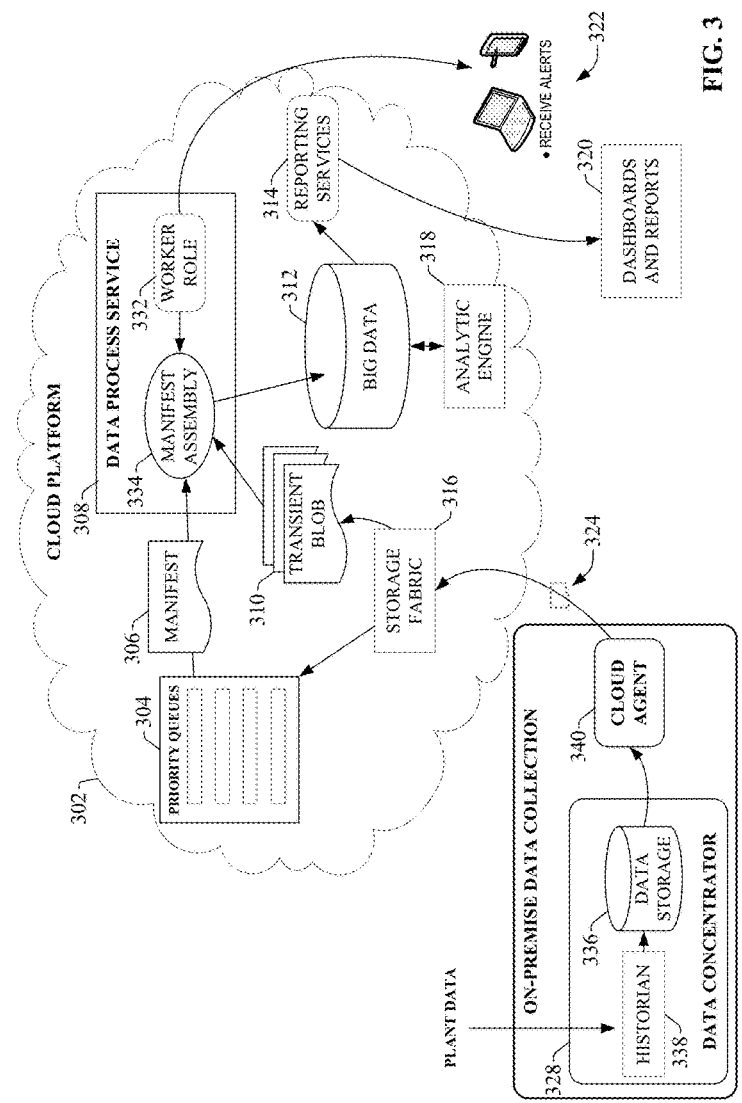
FIG. 3 is an overview of a system that leverages an agent-based cloud infrastructure to provide data collection and processing services to customer manufacturing sites.

FIG. 3 is an overview of a system that leverages an agent-based cloud infrastructure to provide data collection and processing services to customer manufacturing sites. This system can provide remote collection and monitoring services in connection with alarm and event notification for critical industrial assets, historical data collection, remote system access, system optimization, remote closed-loop control, and other such applications. The cloud-based infrastructure enables remote monitoring and reporting of on-premise alarm events, as well as other types of data generated by on-premise industrial devices and systems (e.g., production data, operational statistics, etc.).

In the example illustrated in FIG. 3 a data concentrator 328 collects plant data from one or more industrial assets (e.g., data generated by one or more industrial controllers, such as industrial devices 108 or 110) at a plant facility. These industrial assets can include industrial controllers that monitor and control industrial I/O devices, data servers and historians, motor drives, remote I/O interfaces that remotely interface groups of I/O devices to one or more of the industrial controllers, boilers or other industrial machines, or other such assets. For example, data concentrator 328 can monitor one or more controller tags defined in a tag archive and store data in local data storage 336 (e.g., a local structured query language, or SQL, server) associated with a historian 338. The collected data can include historical data (e.g., alarm history, status history, trend data, etc.), live data values read from the industrial assets, alarm data generated by the industrial assets, or other types of data.

An on-premise cloud agent 340 is configured to collect the live or historical data from the industrial assets, either directly or by accessing data storage 336 associated with data concentrator 228. Cloud agent 340 can execute on any suitable hardware platform (e.g., a server, a LINUX box, etc.), and acts as a generic gateway that collects data items from the various industrial assets on the plant network and packages the collected data according to a generic, uniform data packaging schema used to move the on-premise data to a cloud platform 302. Cloud agent 340 provides a software mechanism to dynamically link on-premise-to-cloud gateways. Cloud agent 340 provides an expandable data type schema that allows new data types to be added without the need to redeploy the monitoring system to the cloud.

During data collection, the cloud agent 340 can intelligently sort and organize the data based on defined criteria, including but not limited to time of occurrence and/or user-defined priorities. Cloud agent 340 can be, for example, a service (e.g., a Windows service) that periodically collects and transmits serialized and compressed data into the cloud domain using standard web services over HTTPS/SSL.

FIG. 3 depicts data concentrator 328 as the data source for cloud agent 340. This configuration can be useful if there are a large number of data points to monitor, since the data concentrator can 328 can link multiple industrial devices or other data sources to a single cloud agent 340. However, some embodiments of cloud agent 340 can collect data directly from the industrial assets themselves; e.g., through a common industrial protocol link, or through middleware applications such as OPC clients.

Figure 4:
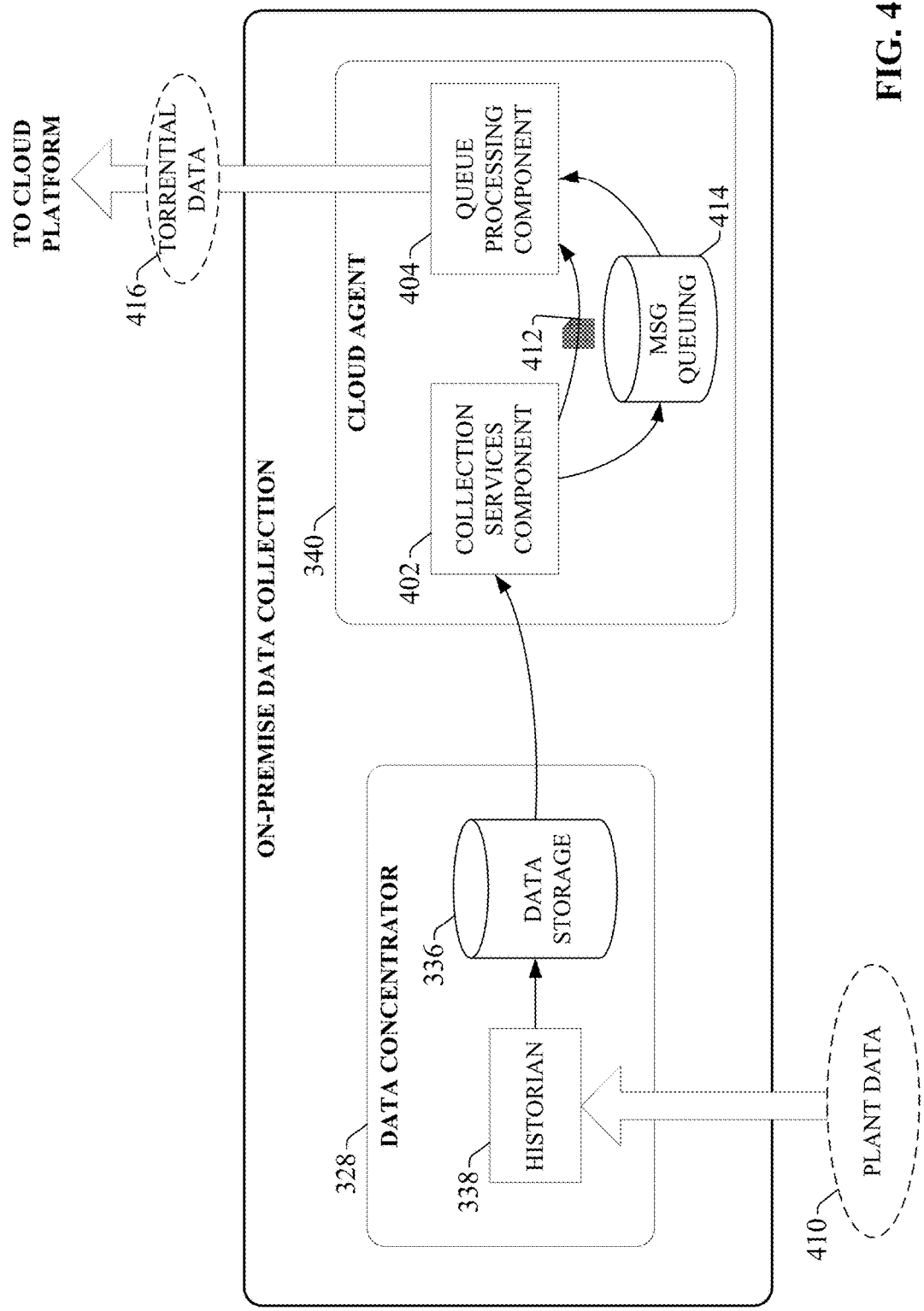
FIG. 4 is a block diagram illustrating on-premise data collection.

Cloud agent functionality is illustrated in more detail with reference to FIG. 4. On-premise data collection is enabled by a collection of services that function as a virtual support engineer for processing data. Data concentrator 328 and cloud agent 340 respectively implement two main functions associated with data collection—data concentration using a historian 338 and associated data storage 336 (e.g., an SQL server), and cloud data enablement using cloud agent services executed by cloud agent 340. As noted above, plant data 410 is collected by data concentrator 328 at the plant facility. In an example scenario, plant data 410 may comprise stamping press time series sensor data, made up of thousands of data points updated at a rate of less than a second.

Collection services component 402 of cloud agent 340 implements collection services that collect device data, either from data concentrator's associated data storage (e.g., via an SQL query) or directly from the devices themselves via a common industrial protocol (CIP) link or other suitable communication protocol. For example, to obtain data from data concentrator 328, collection services component 402 may periodically run a data extraction query (e.g., an SQL query) to extract data from data storage 336 associated with data concentrator 328. Collection services component 402 can then compress the data and store the data in a compressed data file 412. Queue processing services executed by queue processing component 404 can then read the compressed data file 412 and reference a message queuing database 414, which maintains and manages customer-specific data collection configuration information, as well as information relating to the customer's subscription to the cloud platform and associated cloud services. Based on configuration information in the message queuing database 414, queue processing component 404 packages the compressed data file 412 into a data packet and pushes the data packet to the cloud platform. In some embodiments, the cloud agent 340 can support injecting data packets as torrential data 416.

Message queuing database 414 can include site-specific information identifying the data items to be collected (e.g., data tag identifiers), user-defined processing priorities for the data tags, firewall settings that allow cloud agent 340 to communicate with the cloud platform through a plant firewall, and other such configuration information. Configuration information in message queuing database 414 instructs cloud agent 340 how to communicate with the identified data tags and with the remote data collection services on the cloud platform.

In addition to collection and migration of data, one or more embodiments of cloud agent 340 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent 340 may be configured to compress the collected data using any suitable data compression algorithm prior to migrating the data to the cloud platform. This can include detection and deletion of redundant data bits, truncation of precision bits, or other suitable compression operations. In another example, cloud agent 340 may be configured to aggregate data by combining related data from multiple sources. For example, data from multiple sensors measuring related aspects of an automation system can be identified and aggregated into a single cloud upload packet by cloud agent 340. Cloud agent 340 may also encrypt sensitive data prior to upload to the cloud. In yet another example, cloud agent 340 may filter the data according to any specified filtering criterion (e.g., filtering criteria defined in a filtering profile stored on the cloud agent). For example, defined filtering criteria may specify that pressure values exceeding a defined setpoint are to be filtered out prior to uploading the pressure values to the cloud.

In some embodiments, cloud agent 340 may also transform a specified subset of the industrial data from a first format to a second format in accordance with a requirement of a cloud-based analysis application. For example, a cloud-based reporting application may require measured values in ASCII format. Accordingly, cloud agent 340 can convert a selected subset of the gathered data from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Cloud agent 340 may also associate metadata with selected subsets of the data prior to migration to the cloud, thereby contextualizing the data within the industrial environment. For example, cloud agent 340 can tag selected subsets of the data with a time indicator specifying a time at which the data was generated, a quality indicator, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud agent 340 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud agent 340 can support HTTPS/SSL, certificate authority enabled transmission, and/or unique identity using MAC addresses. Cloud agent 340 can also support store-and-forward capability to ensure data is not lost if the agent becomes disconnected from the cloud.

Returning now to FIG. 3, cloud agent 340 sends compressed data packet 324 to the cloud-based data collection and monitoring system on cloud platform 302 via a cloud storage fabric 316. The data packet 324 conveys parameters and data (compressed and serialized) used by the cloud-side services to reconstruct the domain data structure in the cloud using auxiliary tenant-level manifests. The cloud services direct remote storage of the received data into preconditioned transient blobs 310. The cloud platform 302 can use agent reasoning and collective bargain features to determine a data storage locale.

Through the configuration interface provided by cloud agent 340, users at the plant facility can dynamically configure one or more priority queues 304 that respectively define how the data packets are processed in the cloud platform 302. For example, separate queues may be defined for alarms, live data, and historical data, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and cloud agent 340 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time monitored data, such as current temperatures, current pressures, etc. The live data values can also be accessed through the API (e.g., a SQL API). The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, cloud agent 340 can allow the user to define these priority queues 304 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by a remote operator interface application to view substantially real-time data from the plant facility, while historical data queue may be used to process historian data for archival storage in a historical database on cloud storage. Accordingly, the live data queue may be assigned a higher priority relative to the historical data queue, since data in the live data queue is more time-critical than data in the historical queue.

Through cloud agent 340, users can assign priorities to respective data tags or tag groups at the customer site. These priority assignments can be stored in the message queuing database 414 of the cloud agent 340. Accordingly, when queue processing component 404 packages the collected data to be moved to the cloud platform, the collected data items can be packaged into data packets according to priority (as defined in message queuing database 414), and the respective data packet headers populated with the appropriate priority level. If access to the cloud is unavailable, data will continue to be collected by collection services component 402 and stored locally on the cloud agent in local storage associated with collections services. When communication to the cloud is restored, the stored data will be forwarded to cloud storage. Queue processing services can also encrypt and send storage account keys to the cloud platform for user verification.

Figure 5:
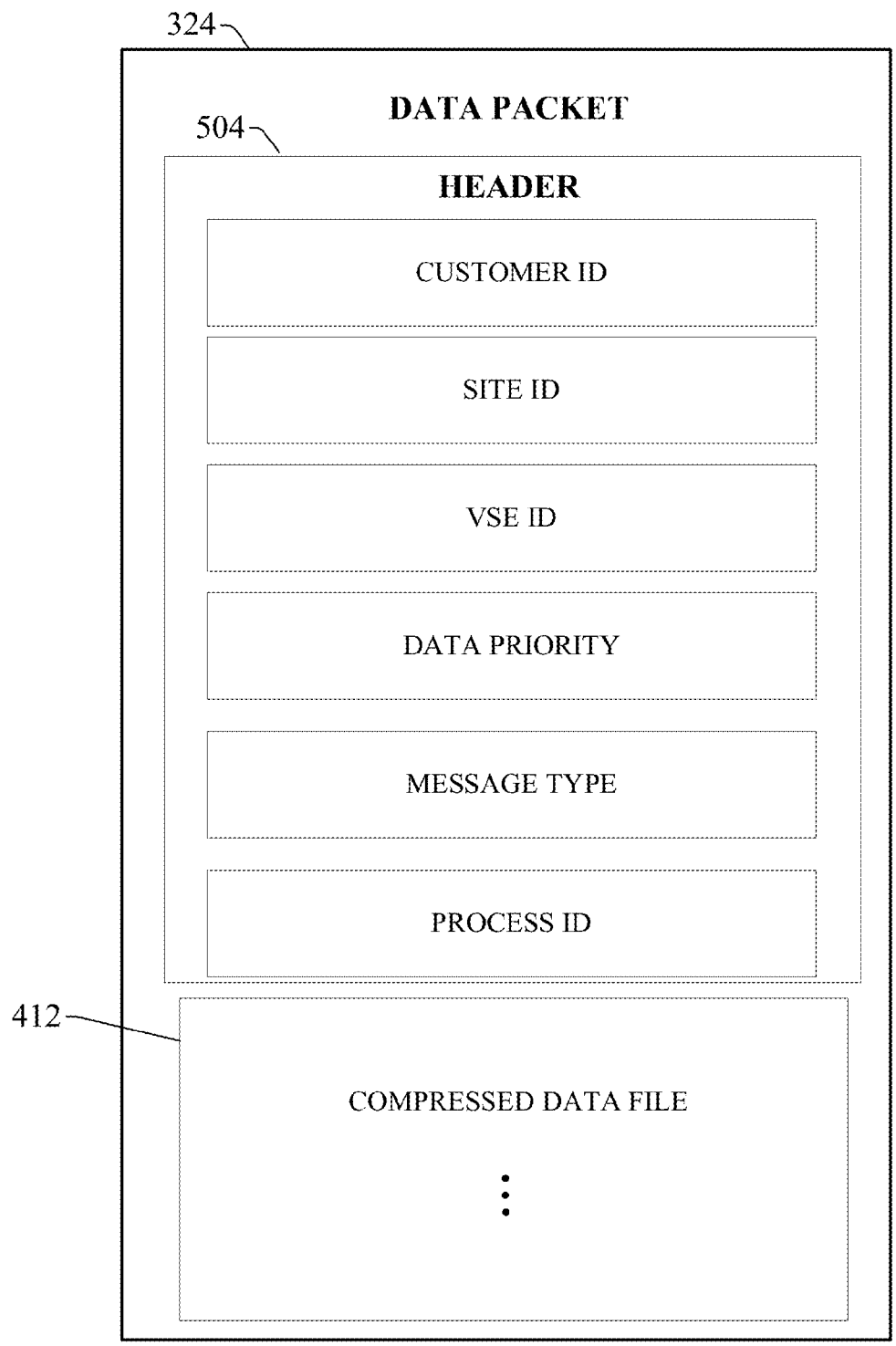
FIG. 5 is a diagram of an example compressed data packet.

Message queuing services implemented by queue processing component 404 of cloud agent 340 encapsulates or packages the compressed data file by adding customer-specific header information to yield a compressed data packed (e.g., compressed data packet 324 of FIG. 3). For example, the queue processing component 404 can access a message queuing database (e.g., message queuing database 414 of FIG. 4), which stores customer site configuration information and manages the customer's subscription to the cloud platform services. The message queuing database may include such information as a customer identifier associated with the customer entity associated with the industrial enterprise, a site identifier associated with a particular plant facility from which the data was collected, a priority to be assigned to the data (which may be dependent on the type of information being sent; e.g., alarm data, historical data, live operational data, etc.), information required to facilitate connection to the customer's particular cloud fabric, or other such information. The information included in the header is based on this customer-specific information maintained in the message queuing database. An example compressed data packet is illustrated in FIG. 5. As shown, the cloud agent's message queuing services add a header 504 to compressed data file 412 to yield the compressed data packet 324. The header 504 contains customer-specific data read from message queuing database 414. For example, header 504 can include a unique customer identifier, a site identifier representing a particular plant facility, a virtual support engineer identifier, a data priority for the data in the compressed data file 412, a message type, and a process identifier that specifies a particular manifest application on the cloud platform that should be used to process the data on the cloud side. Packaging the data in this way can allow data from diverse data sources to be packaged together using a uniform, generic data packaging schema so that the data can be moved to the cloud infrastructure When cloud agent 340 sends a data packet to the cloud-based remote processing service, the service reads the packet's header information to determine a priority assigned to the data (e.g., as defined in a data priority field of the data packet) and sends the data packet (or the compressed data therein) to a selected one of the user defined priority queues 304 based on the priority. On the other side of the priority queues 304, a data process service 308 processes data in the respective priority queues 304 according to the predefined processing definitions. The data processing service includes a worker role 332 that determines how the queued data is to be processed. In some scenarios, the queued data can be processed based on manifests (e.g., system manifests, tag manifests, and metric manifests) stored in a customer-specific manifest assembly 334. Manifests define and implement customer-specific capabilities, applications, and preferences for processing collected data in the cloud. Manifests can be dynamically uploaded by a user at the plant facility through cloud agent 340, which facilitates dynamic extension of cloud computing capability.

For example, if new data points are to be added to the data collection system that require creation of a new data queue, the user can interact with cloud agent 340 to configure a new manifest for the new queue, the manifest defining such aspects as processing priority for the data, upload frequency for the data, where the data is to be routed or stored within cloud storage, and other such information. Cloud agent 340 can then upload the new manifest 306 together with the data (or independently of the data). The new manifest 306 is then added to the customer's manifest assembly 334 with the other manifests defined for the customer, so that worker role 332 can leverage the new manifest 306 to determine how data in the new queue is to be processed. This new manifest 306 need only be uploaded to the cloud-based remote monitoring service once. Thereafter, data placed in the new priority queue will be processed by worker role 332 according to the new manifest 306 stored in the customer's manifest assembly 334. For example, the manifest may define where the data is to be stored within cloud storage (e.g., in a historical database, and Alarms and Live Data database, big data storage 312, etc.), and whether processing of the new data queue is to take priority over other data queues. In some embodiments, the manifest assembly 334 may only accept a new manifest if the manifest is accompanied by a unique key associated with the client.

Once the cloud-based infrastructure has processed and stored the data provided by cloud agent 340 according to the techniques described above, the data can be made accessible to client devices 322 for viewing. Data analysis on the cloud platform 302 can provide a set of web-based and browser enabled technologies for retrieving, directing, and uncompressing the data from the cloud platform 302 to the client devices 322. To this end, reporting services 314 can deliver data in cloud storage (e.g., from the big data storage 312) to the client devices 322 in a defined format. For example, reporting services 314 can leverage collected data stored in the cloud repository to provide remote operator interfaces to client devices 322 over the Internet. An analytic engine 318 executing on the cloud platform 302 can also perform various types of analysis on the data stored in big data storage 312 and provide results to client devices 322.

Figure 6:
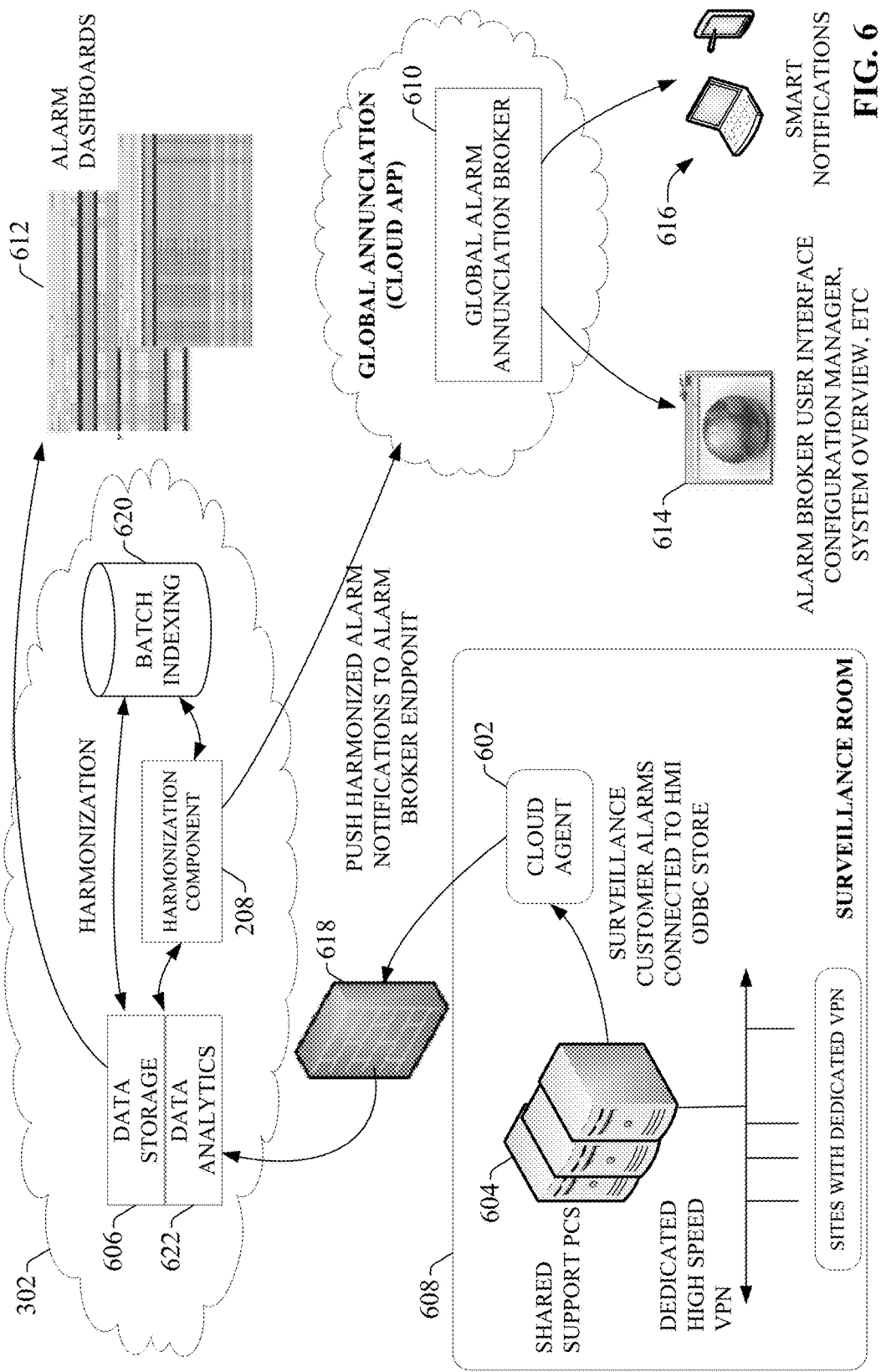
FIG. 6 is a diagram of a data collection and notification subscription system that utilizes the global alarm annunciation broker system.

FIG. 6 is a diagram of a data collection and notification subscription system that utilizes the global alarm annunciation broker system. The system uses cloud-level functionality to gather alarm data from various industrial sites (e.g., using the agent-based architecture described above). The system includes a subscription layer that allows harmonized alarm data to be pushed to the brokering system using cloud agent devices. The cloud-based broker system is designed to notify application-level experts—via client devices 616—of events and anomalies that emerge from the industrial processes being monitored. These notifications can alert supervisors and system managers of potentially harmful or otherwise detrimental situations occurring in the production lines or devices, so that corrective measures can be taken in an organized manner Among other benefits, the global alarm annunciation system can expedite locating and notifying suitable technical experts in response to detection of an alarm condition so that countermeasures can be applied quickly.

A cloud agent 602 (similar to the cloud agents described above) collects on-premise data from one or more industrial assets or data collectors. In an example configuration, a set of shared support computers 604 maintained in a surveillance room 608 can be connected to cloud platform 302 via cloud agent 602. Shared support computers 604 monitor customer alarms and other data by connecting to devices on customer sites via a dedicated high-speed virtual private network (VPN). For example, the shared support computers 604 may connect to an ODBC (open database connectivity) store of a human-machine interface (HMI), a data table of an industrial controller (e.g., a PLC or other type of industrial controller), or other sources of industrial asset data. The shared support computers 604 are also networked to cloud agent 602, which is communicatively linked to cloud platform 302 via firewall 618 (e.g., using HTTPS, secure sockets layer, or another secure communication protocol), and which enables data ingestion from the industrial facility to data storage services 606 and data analytics services 622 on cloud platform 302. Cloud agent 602 collects, serializes, and compresses various types of data from the on-premise industrial assets, including but not limited to I/O data (e.g., time-series sensor data), alarms, documentation data, etc. In general, the global alarm annunciation broker features described herein are focused primarily on the alarm data collected by cloud agent 602 and provided to the cloud platform for processing. On the cloud platform 302, a global alarm annunciation broker (GAAB) system 610 makes intelligent decisions regarding and how to organize and filter the alarm data, how to handle detected alarm events, and which technical resources should be contacted to quickly and effectively address the alarm events.

Alarm processing services on the cloud platform 302 copy alarm data from cloud storage 606 as alarm batches to the GAAB system 610, which filters the alarm data and matches alarm events to technical experts. The GAAB system that carries out the alarm brokering functions executes on the cloud platform 302 on cloud servers or other cloud-level devices. The cloud platform 302 includes a set of databases (e.g., structured query language (SQL) databases) that are used by the brokering services to temporarily store the alarm batches while the batches are being processed by the brokering functions.

The cloud-side services include a harmonization component 208 that gathers alarm data from data storage 606 in batches. The harmonization component 208 harmonizes alarm data in each batch and transfers the harmonized alarm data to the GAAB system 610 via a subscription channel into a GAAB-level entry queue. Alarm harmonization creates a common schema around the alarm data by adding a harmonization envelop to the original alarm data structure while maintaining the original format of the alarm data. Harmonizing the alarm data in this manner allows the alarm data to be processed by the GAAB system 610 using a common set of business intelligent rules.

FIG. 7 illustrates an example format for a harmonized alarm list comprising a list of alarm records, each record comprising a set of data fields. Each raw-level (pre-harmonized) alarm contains information for identifying a location or application of origin for the alarm (the Application ID field), a description of the alarm (the Description field), and a time stamp (the Time Stamp field). To create an alarm batch, the harmonization assembly role executing on the cloud platform harmonizes each raw-level alarm by adding fields for the Time Zone, Technology, Status, Mode, and Filter Key to each alarm record. The Status field can identify a current processing status of the alarm—e.g., In Process, Waiting, Served, Escalated, or Completed. The Mode field indicates a mode of the alarm record—e.g., Filtered, Correlated, Base, Managed, or Master. These modes and status are described in more detail below. The Technology field identifies a particular technology to which the alarm relates, which can be used by the GAAB services to identify a suitable set of technical experts for addressing the alarm event identified by the alarm. The filter key can identify a field (e.g. the Application ID or Technology fields) to be used as a filter key. It is to be appreciated that the harmonization schema illustrated in FIG. 7 is only intended to be exemplary, and that any suitable schema can be used to harmonize the alarm data records without deviating from the scope of this disclosure.

Returning now to FIG. 6, the harmonized alarm records are accumulated in a transferring batch and transferred to the GAAB system 610. The size of the batch and its transmission rate can be configured by a system manager during a system configuration phase prior to initiating data collection and processing. To this end, the GAAB system 610 can generate and serve an alarm broker user interface 614 to a client device. The alarm broker user interface 614 affords the system manager access to a broker management portal that allows a number of configuration settings for the GAAB services to be set, including but not limited to the transfer rate for batch transfers from the batch indexing database 620 to the GAAB system 610.

The alarm batch contains alarm records collected from various industrial devices and applications, and can also include alarm records from multiple different industrial facilities being monitored. The harmonization component 208 enforces data sovereignty in scenarios in which alarm data from multiple customers is being collected. The harmonization component 208 also tracks alarm indexing as the alarm records are copied and harmonized. To manage batch indexing information, the harmonization assembly role can store alarm batch information in the batch indexing database 620. In this way, the harmonization component 208 can keep track of which alarm records have been sent to the GAAB system 610. If the transmission channel to the GAAB system 610 becomes temporarily unavailable, the harmonization component 208 can temporarily cease harmonization and transmission of alarm batches while new alarm data continues to be received from the cloud agent 602. In such scenarios, the harmonization component 208 will recommence harmonization and batch transfer when the transmission path to the GAAB system 610 is re-established.

In some embodiments, the harmonization component 208 can transmit the alarm batch to the GAAB system 610 synchronously. For each batch transmission, the harmonization component 208 expects an acknowledgement from the GAAB system. In the case of an interruption or unsuccessful transmission, the harmonization component 208 can log the transmission failure with a time-stamp and a record of the GAAB system's response (e.g., Transmission Failure, Not Available, etc.). In the event of multiple unsuccessful attempts to transmit a batch to the GAAB system 610, a user interface component can send a notification to a system manager via a mobile device, email, or other notification means. All successful and unsuccessful alarm batch transmissions are logged in the batch indexing database 620.

Figure 8:
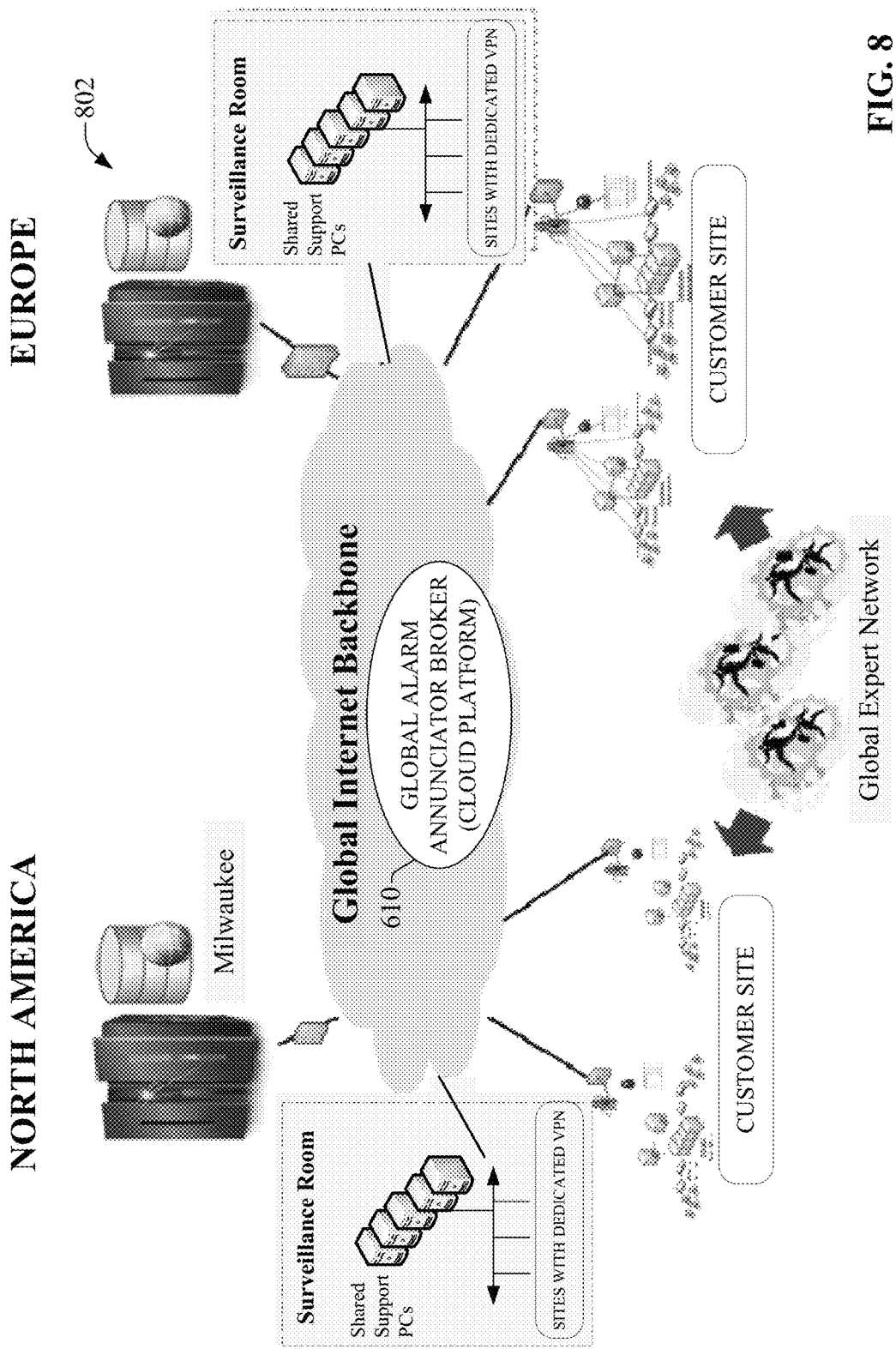
FIG. 8 is a high-level diagram of an example cloud-based infrastructure for a global alarm annunciation broker.

FIG. 8 is a high-level diagram of an example cloud-based infrastructure for a global alarm annunciation broker. The GAAS system 610 is configured to search a global expert network for appropriate technical support resources in response to detecting an alarm condition at an industrial facility requiring expert assistance. The GAAS system 610 employs a "follow-the-sun" approach to identifying an available technical support resource as quickly as possible to address a detected alarm event. For example, when an alarm event is identified based on analysis of the harmonized alarm batches described above, the GAAS system 610 first performs a search of local technical support resources within the same geographical region from which the alarm was received. If no suitable local technical support resource is found, or if local technical support experts are not available (e.g., due to the time at which the alarm event occurred), the GAAS system 610 can expand the technical support search to other geographical regions. For example, the GAAS system 610 may generate a technical support ticket for an alarm event detected at a European facility 802 during an overnight shift. In this scenario, the GAAB system 610 may initially perform a technical support search that is limited to Europe. However, since the alarm event was generated during the overnight shift, technical experts capable of assisting with the alarm event may not be available at that time in Europe. The system can make a determination regarding availability of technical support personnel based on availability data maintained on a cloud-based expert database, as will be described in more detail below. Since no suitable technical support experts are available in Europe at the time the alarm event was detected, the GAAS system 610 can extend the search for a technical resource to a region in another time zone—e.g., North America—where technical support personnel are more likely to be available at that time. In general, the cloud platform serves as a seamless conduit to realize these inter-regional connections.

Figure 9:
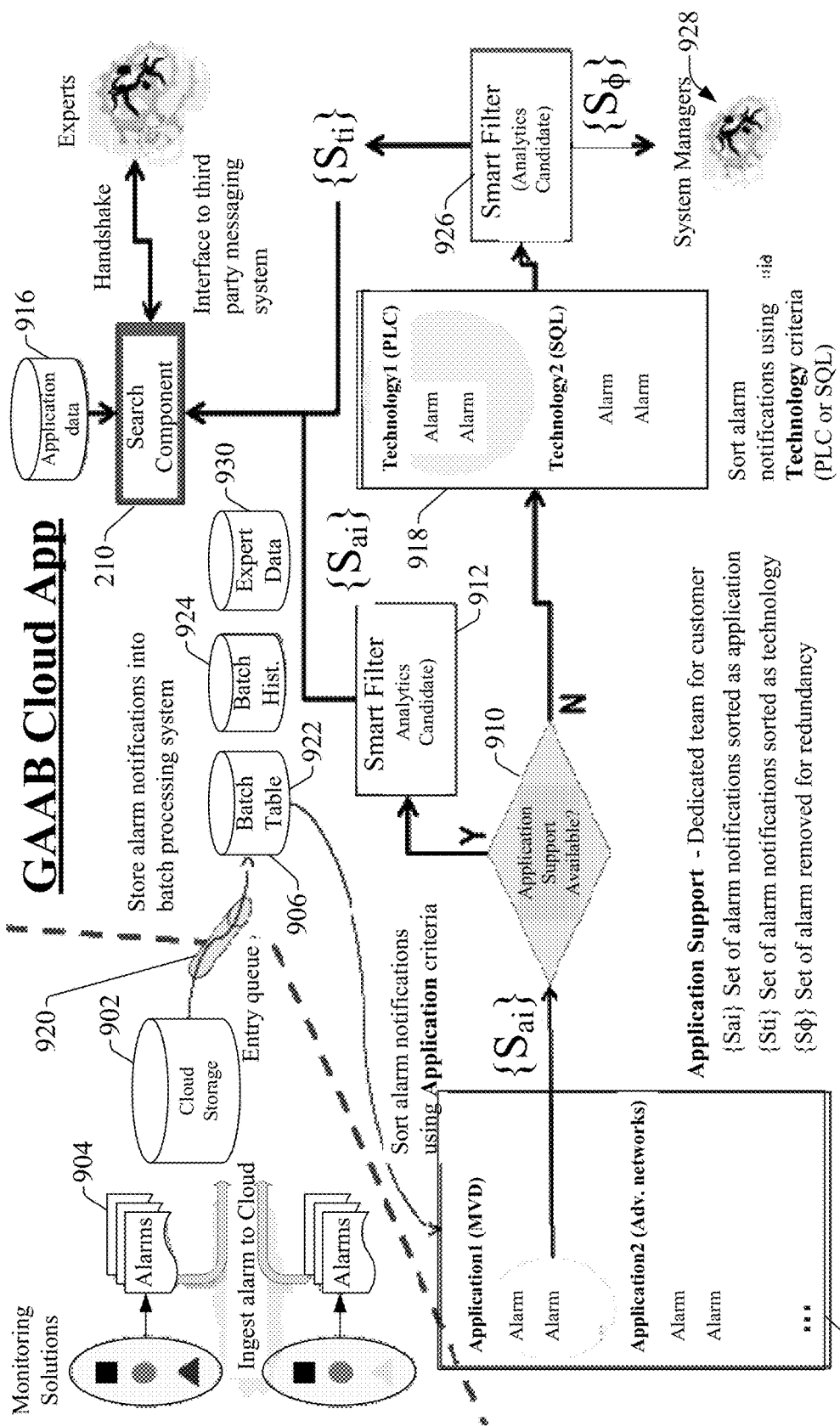
FIG. 9 is a diagram illustrating an example logical architecture for the cloud-based global alarm annunciation system.

FIG. 9 is a diagram illustrating an example logical architecture for the cloud-based global alarm annunciation system. As described above, the harmonization component executes an alarm mapping utility that moves alarm batches 904 from cloud storage 902 to an entry queue 920 in the GAAB system. When an alarm batch 904 arrives in the entry queue 920, a GAAB-level worker role component moves the alarm batch to a batch data table 908 of a cloud-based batch table database 906. The GAAB system processes alarms within a given alarm batch independently of other batches, thereby maintaining a properly adjusted batch lifecycle for each batch. To track alarm lifecycles throughout the various filtering and transformation operations that are performed on the alarm records comprising each alarm batch, the worker role component can change the status and mode attributes of the respective alarm records depending on whether the alarm sorting is driven by the application attribute or the technology attribute (see the harmonized schema of FIG. 7). When an alarm batch is received, the worker role component establishes an initial condition for all alarms in the arriving batch by setting the status field of each alarm record to Idle.

The GAAB-level worker role component captures essential statistical information from the batch, such as the size of the batch (e.g., the number of alarm records contained in the batch) and an alarm mix range indicating the range of different types of alarms contained in the batch. Statistics for each alarm batch are maintained in a cloud-based batch historian database 924. To determine the alarm mix range for the batch, the worker role component can execute a script (e.g., an SQL script) that sorts the alarm records contained in the batch according to the Application ID attribute. The Application ID attribute can indicate, for example, a type of on-site application to which the alarm event relates (e.g., medium voltage drive alarms, advanced network alarms, etc.). By sorting the alarm records in the batch according to Application ID, the alarms stored in the batch data table 908 are organized into application-specific alarm sets according to Application ID. The worker role component can determine the alarm mix range for the batch based on the number of unique Application IDs that are contained in the batch data table 908 for the batch. Once these batch statistics are stored in the batch historian database 924, they can be accessed for viewing by a system manager via the alarm broker user interface 614.

Each Application ID in the sorted table becomes the access key into a subset of alarms specific to a particular application type. The alarm-sorting worker role then operates on each application-sorted alarm set $\{S_{ai}\}$ to apply a first-level business intelligence decision rule that determines whether the application type identified by the Application ID for that alarm set can be addressed by a support entity that is local to the customer site at which the alarm was generated (decision step 910). The determination of which (if any) local support entities can assist with a particular Application ID can be based, for example, on application-level data entered into an application database 916 by a system manager via the alarm broker user interface 614. This application-level data can be derived in part from customer contract information associated with the industrial enterprise from which the alarm data was received.

In an example scenario, the decision step 910 can generate a YES result if the customer contract specifies that the customer site at which a given alarm was generated has its own application support center. When the worker role component determines, based on the customer contract information, that an application support center is available for the customer site, the alarm set is filtered by a smart filter 912 using redundancy criteria to reduce the alarm set size by eliminating redundant information from the set. The status field for each alarm in the reduced set is changed to Waiting, and the mode field for each alarm is set to Managed, indicating that the alarm set is to be managed by its own service center. Since the filtered alarm set is managed by its own service center, the broker system does not further filter the alarm set. The filtered set is then sent to search component 210, which performs a search for local support personal who are available to assist in addressing the alarm event.

Alternatively, if the customer contract specifies that the customer site that generated the current alarm set does not have its own application support center (NO at decision step 910), the alarm set is further sorted according to Technology (e.g., PLC alarms, SQL alarms, etc.). The resulting technology-sorted alarm set 918 is then filtered for redundancy by smart filter 926 using a redundancy checker filter, yielding a filtered technology-sorted set $\{S_{ti}\}$.

In one or more embodiments, the redundancy checking rules used by smart filter 926 are designed to be applied to alarm sets sorted by technology (based on the Technology field of the harmonized alarm records). These filtering rules focus on the technology characteristics of the alarms to understand alarm patterns within the alarm set, and are configured to identify (1) alarm repetitions, (2) alarm correlations, and (3) pass-through alarms.

To identify and filter alarm repetitions within the set, the filtering rules first group all repeated alarms into temporary sets. For each set of repeated (duplicate) alarms, all alarms except the latest alarm is deleted from the set. The broker system may additionally send a notification to one or more system managers 928 informing of the redundant notifications. In response to the notification, the system managers may chose to take action to mitigate further redundant instances of the alarm; e.g., by inhibiting alarm generation in the appropriate industrial device. Finally, the worker role component sets the Status field of the surviving (non-deleted) alarm to Waiting, and the Mode field to Base.

To identify alarm correlations within a set, the worker role component can identify alarms representing a sequence of alarms (that is, alarms that correlate with each other or were generated as a result of a common alarm event) based on predefined technology and application rules. These related alarms are classified by the system as symbiotic alarms. The worker role component then selects a representative alarm of the set of related alarms as a header alarm, changes the Status field of the selected header alarm to Waiting, and changes the Mode field of the selected header alarm to Master (indicating that the alarm is a master alarm with one or more subordinate alarms). The subordinate (non-header) alarms associated with the header alarm are selected, their Status fields are set to Waiting, and their Mode fields are set to Correlated (indicating that they are subordinate alarms associated with a master alarm). Finally, the Filter Key field of each correlated alarm is set to the value of the Application ID field of the header alarm.

The pass-through rules identify each alarm in the original set that is not affected by the alarm repetition and alarm correlation rules, set the Status fields of these alarms to Waiting, and set the Mode fields of these alarms to Filtered.

To coordinate alarm lifecycle with the brokering process, the worker role modifies the Status and Mode fields of the harmonized alarms according to Table 1 below:

TABLE 1

Effect of Alarm Sorting and Filtering

| Action condition | Status | Mode |
| --- | --- | --- |
| Managed | WAITING | MANAGED |
| Removed | COMPLETED | BASE |
| Promoted | WAITING | BASE |
| Header | WAITING | MASTER |
| Subordinate | WAITING | CORRELATED |
| Pass through | WAITNG | FILTERED |

After application of the filtering rules described above, the technology-filtered alarm set $\{S_{ti}\}$ is sent to search component 210 to initiate a search for technical experts capable of assisting with corrective measures for the particular alarms identified in the filtered alarm set. For example, the search component 210 can perform a search of expert database 930 to identify a subset of experts that satisfy defined criteria relative to each alarm in the set. The expert database is described in more detail below. The brokering system contacts the selected experts using a handshaking process that sends messages to client devices associated with the experts and that tracks the communication lifecycle so that the Status and Mode fields of the alarm records in the set can be updated as needed to reflect the current status of the corrective procedure.

Search component 210 is configured with multithreading capabilities to manage the various application and technology sets that emerge from the brokering process. In one or more embodiments, search component 210 can be configured with two main search modes. Application mode is configured to handle alarms in the application-sorted alarm set $\{S_{ai}\}$, while Technology mode is configured to handle alarms in the technology-sorted alarm set $\{S_{ti}\}$.

In Application mode, search component 210 initiates a handshaking context for each application group in the alarm set $\{S_{ai}\}$. Since all alarms in each group are managed by local experts in this scenario, search component 210 uses the application domain data to extract application-support expert information. That is, for each application-specific alarm group of alarm set $\{S_{ai}\}$, search component 210 identifies a subset of the local experts that are (1) identified as having expertise with the application type identified by the Application ID for the group, and (2) identified as being currently available. Each application group is matched by its corresponding local support center throughout the handshaking process.

The handshaking process is a coordinated request/response procedure that uses a message router having a global reach. According to this handshaking process, search component 210 sends a request to a selected human expert using a preferred notification mechanism specified by the expert in advance (e.g., text, email, phone, etc.). For each case, the technical expert can log onto his or her service account (e.g., via a graphical interface served to the expert's client device by the interface component of the GAAB system) in order to generate an acknowledgement to the request. The handshaking procedure executed by the search component 210 is designed to handle various types of responses to the request (including no response).

In Technology mode, search component 210 initiates a handshaking procedure for each technology group within the technology-sorted alarm set $\{S_{ti}\}$ for all alarms except those whose Mode field is set to Correlated. Correlated alarms are indirectly managed through their associated Master alarm. Search component 210 uses the application domain data to identify a set of technical support personnel capable of addressing the respective Technology groups.

For a given alarm in an alarm set, the search component 210 can identify a subset of technical experts that match the alarm description set forth by the data fields of the harmonized alarm records. The subset of experts can be selected to correspond not only to the alarm description, but also to the relevant technology and time zone indicated by the alarm's Technology and Time Zone fields. The subset of relevant experts can be selected from a set of expert-level information previously provided to the broker system by a system manager and stored in expert database 930 (see FIG. 9). The expert database 930 includes information about respective technical support personnel, classified according to their technology and/or application expertise, time zone, geographic location, availability, and score. Search component 210 filters the pool of experts defined in the expert database 930 by first identifying those experts that are available at the time the alarm event is detected and the time zone that is required by the alarm event. In some embodiments, the search component 210 will first limit the search to experts corresponding to the time zone of origin of the alarm event. However, if no suitable experts are available within the local time zone at the time the event was detected, the search component 210 can then expand the search to other time zones.

In some embodiments, each alarm type has an associated service-waiting period that establishes a time window—beginning at the time at which the user interface component of the GAAB system sends a notification of the alarm event to one or more experts—in which an expert should acknowledge the alarm, indicating that the expert is in the process of servicing the alarm event. Each alarm type can also have an associated time-of-service window for completing the service, indicating a duration within which the expert should address the alarm event indicated by the alarm record. These time windows can be defined, for example, in the application-level database 916 (see FIG. 9). Accordingly, once a selected technical expert acknowledges the alarm notification, the alarm record should not be in the system longer than the time-of-service window stipulated in the application-level database 916.

Once a set of candidate experts satisfying the expertise, time zone, and availability requirements have been identified, the search component 210 sorts the candidate expert set based on scoring. The score for each expert can be based on a pre-defined score information for the expert maintained in the expert database 930. Each expert record may have multiple defined scores for respective different technologies and/or applications, signifying the expert's degree of expertise for each defined technology or application type. When the selected set of experts that satisfy the time zone and availability requirements have been sorted according to score, search component 210 contacts the highest scored experts a first-in-first-out (FIFO) manner using the handshaking context. Once the handshaking context is initiated, the search component 210 expects one of a set of possible responses from the experts. Possible responses include:

1) Request sent to expert and expert acknowledges and accepts the alarm.

2) Request sent to expert but no acknowledgement is received within the expected time window for the alarm.

3) Request set to expert but expert declines servicing the alarm.

Depending on the expert response, the search component 210 advances the status of the alarms in an organized manner to achieve group-level completion (servicing of all alarms in a group within an alarm batch), with a goal of achieving batch-level completion (servicing of all alarm groups in the batch).

Figure 10:
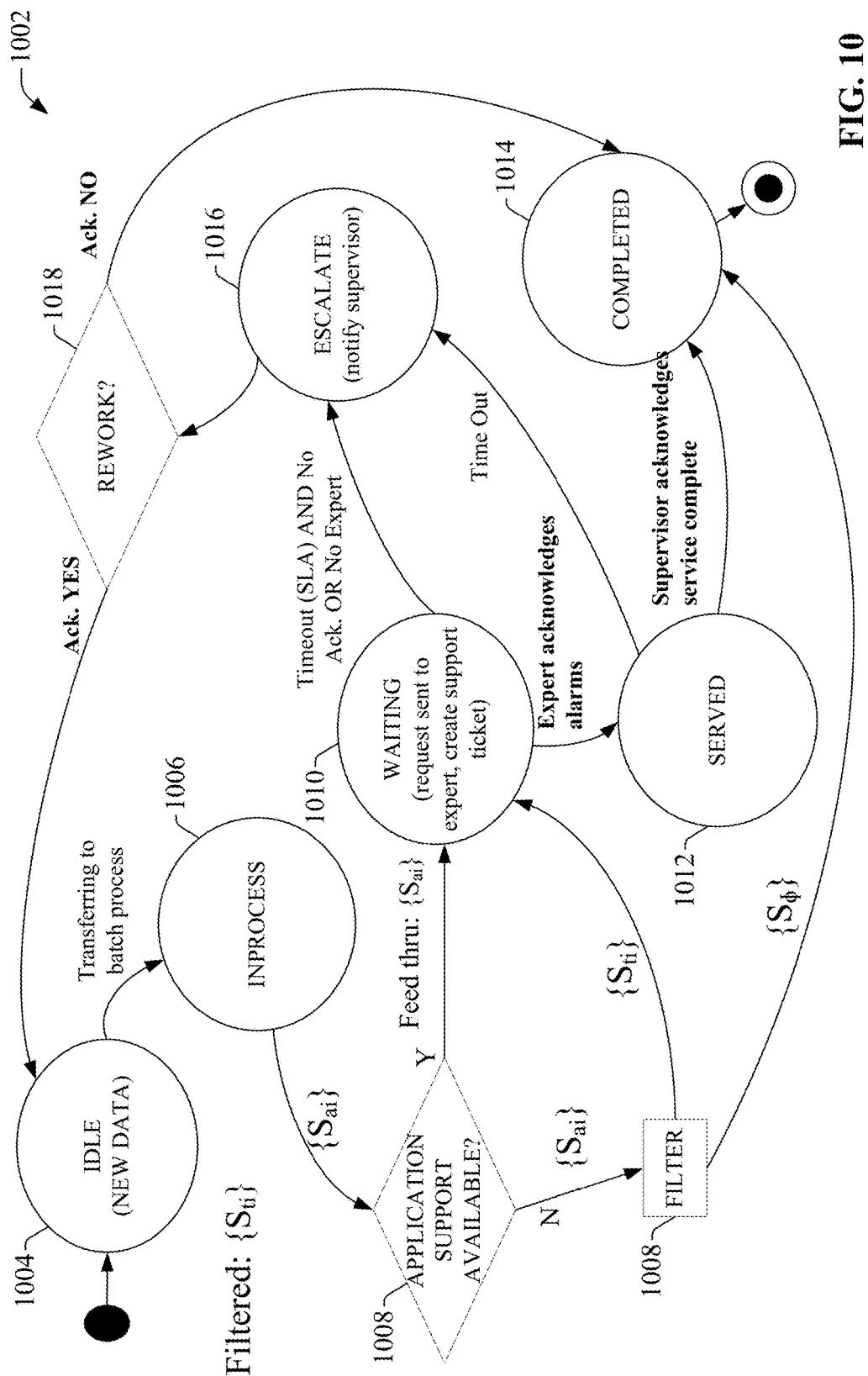
FIG. 10 is a state diagram illustrating example alarm state transitions for managing alarm lifecycle, status and mode transitions, and handshaking processes in connection with the alarm processing and expert matching.

FIG. 10 is a state diagram 1002 illustrating example alarm state transitions for managing alarm lifecycle, status and mode transitions, and handshaking processes in connection with the alarm processing and expert matching features described above. The state transitions can be carried out, for example, by the worker roles, filters, and search engine described above. In the following description, the term "alarm" can refer to either an alarm group or a single alarm within a technology. Moreover, actions indicated in bold represent actions performed manually by a technical expert, system manager, or supervisor via a user interface served to the user's personal client device. Other actions not in bold represent actions taken by the GAAB system (e.g., the worker role component, search component, or other component of the GAAB system).

When a new alarm is received at the entry queue 920 as part of an alarm batch, the Status field is initially set to Idle 1004. When the GAAB-level worker role component moves the alarm batch to the batch data table for batch processing system, the Status is set to In Process 1006. As described above, a determination is the made at decision step 910 regarding whether local application support is available for the alarm. If so, the application-sorted alarm set $\{S_{ai}\}$ is fed through, and the alarm's Status field is set to Waiting 1010. Alternatively, if no local application support is available, filter 926 sorts alarm set $\{S_{ai}\}$ according to technology to yield technology-sorted alarm set $\{S_{at}\}$, and the alarm's Status field is set to Waiting 1010. When an alarm is acknowledged and accepted by the expert, the alarm's Status field is set to Served 1012. An alarm having a Served status will wait for completion for a specified period of time. This time constraint is managed by the handshaking context. If an alarm times-out while in the Served status (e.g., the defined time-of-service duration expires prior to confirmation from the expert that service is complete), the alarm is escalated and the worker role component sets the Status field for the alarm to Escalate 1016. When an alarm is placed in the Escalate state, the system sends a notification to a supervisor or system manager indicating that service for the alarm has not yet been completed. Alternatively, if the notified expert serves the alarm within the stipulated time and provides a completion acknowledgement, the worker role component changes the alarm's Status field to Completed 1014.

If the highest-scored expert is not able to acknowledge or serve the alarm within the stipulated times, the search component 210 sends a notification to the expert with the next-highest score for the given alarm, and the handshaking context updates its process to follow up with the expert's likely responses. Alarms in Escalate status remain in this status until the notified system manager or supervisor acknowledges the condition (e.g., via the alarm broker user interface 614). Acknowledgement of the Escalated status (Ack. YES at decision step 1018) can cause the system to place the alarm back in Idle status, triggering a complete reworking of the alarm. Alternatively, the system manager or supervisor may promote the the alarm to Completed status 1014 due to obsolescence (Ack. NO at decision step 1018).

In some embodiments, the harmonized alarm records may also include a Retry attribute that is used in connection with the Escalate status. While an alarm is in Escalate status, the system manager or supervisor may look at the Retry attribute to determine whether the alarm has already been processed. If the system manager or supervisor decides to approve re-working of the alarm, the Retry attribute is incremented. The Retry attribute can help to control alarm reprocessing.

Once all alarms in a batch have been processed and completed, or the supervisor promotes the batch to Completed status, the handshaking context can create an entry in the batch history database 924 to log a record of the batch completion. The alarm sorting worker role then removes the alarms' data from the batch table database 906.

Handshaking communication with a selected technical expert begins when the search engine 914 or a related communication component sends a message to the technical expert. The system can sent the notification to the expert via any suitable communication method, including but not limited to text message, email, or a phone call. The messages can be sent to a pre-defined client device associated with the expert, such as a laptop/desktop/tablet computer, mobile phone, or other such devices. In some embodiments, each expert's preferred method of communication can be specified by a technical support service contract between the expert and the service provider who manages the GAAB system. The expert may also enter his or her contact preferences into the expert database 930 in some embodiments; e.g., via a configuration management portal accessed via the expert's personal device.

Figure 11:
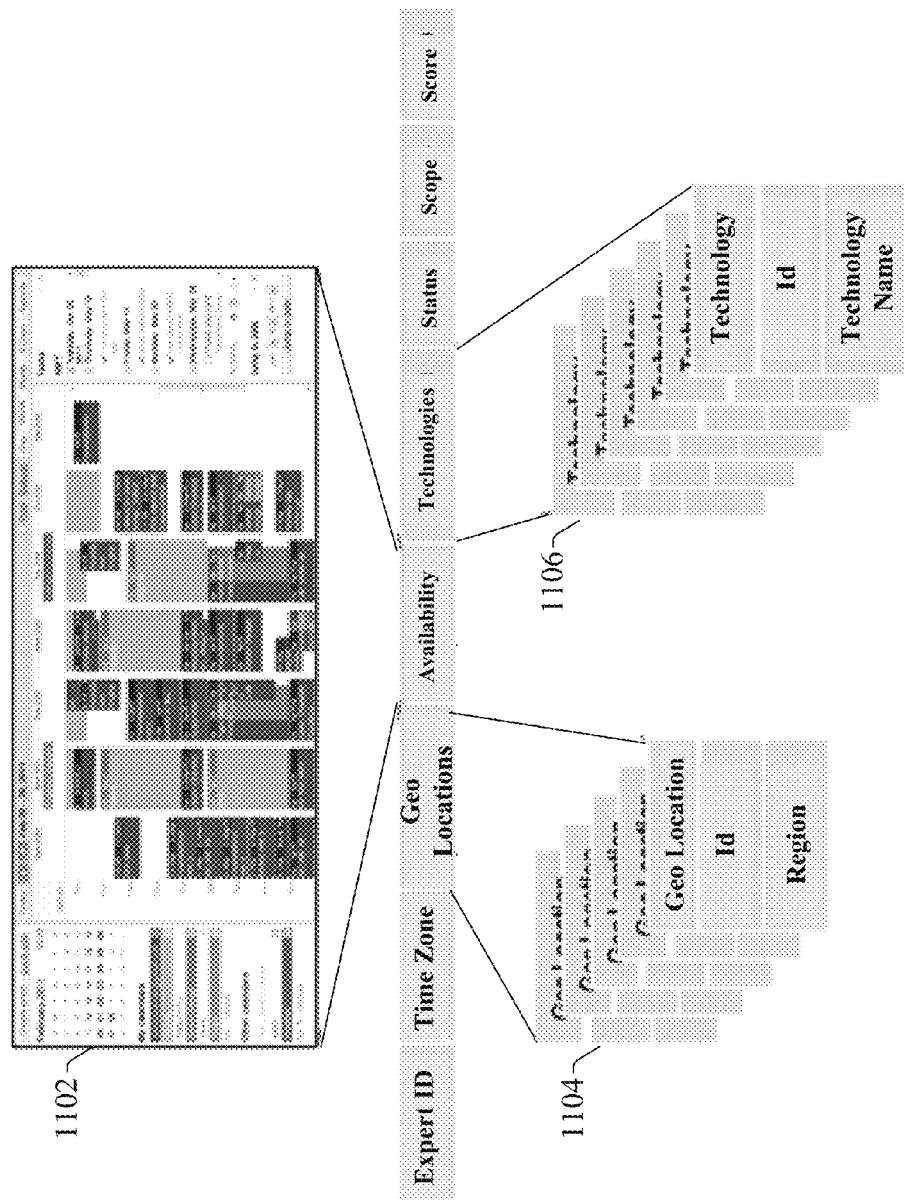
FIG. 11 is an example schema for expert-level data that can be maintained in expert database for respective technical experts.

FIG. 11 is an example schema for expert-level data that can be maintained in expert database 930 for each technical expert. Expert-level data can include, for example, an Expert ID field, a Time Zone field, a Geographical Location field, an Availability, a Technologies field indicating one or more technologies (e.g., industrial application types, device types, etc.) with which the expert is qualified to assist, a Status field, a Score, and/or other such information. Each expert-level data record may also include a Scope field that defines the expert's access privileges to data within the expert database 930 or other information within the GAAB system. Some of these parameters may change over time as the expert acquires additional expertise and mobility within his or her field of operation, or when the expert changes service regions.

The Geographical Location field can specify the areas or regions in which the expert operates. Data within the Geographical Location field can comprise a structured set of sub-records 1104 that identify the geographical locations using an ID field and a region field. The Technologies field can comprise a set of sub-records 1106 that identify the relevant technologies using an ID field and a Technology Name field. The Availability field indicates the expert's service schedule. Information in the Availability field can be set using a calendar-like scheduling interface 1102 that allows the user to indicate the days and times during which the user will be available to assist with alarm events. This schedule can be kept up-do-date to reflect changes in jobs, vacations, sick leave, etc. The Status field indicates the present status of an activity in which the expert is engaged. Example values for the Status field can include Idle, Busy, Leave, Connected, Disconnected, Traveling, etc.

The Score field represents a quality of service value (e.g., a value between 1 and 100). In some embodiments, the score can be manually updated by the expert or by a supervisor or system manager to represent the expert's general level of expertise. Alternatively, in some embodiments the GAAB system may calculate a score for the expert automatically based on analysis of the expert's service history, as reflected by data collected for the expert during service activities. Factors that can be used by the GAAB system to calculate a score for a given expert can include, but are not limited to, an average time for the expert to respond to an alarm notification, an average time for the expert to complete a service action associated with an alarm event, types of applications and technologies for which the expert has provided service, etc. In some embodiments, the score field may comprise multiple application-specific or technology-specific scores, providing a more granular indication of the expert's degree of expertise relative to particular applications and technologies. Accordingly, when the search component 210 performs an expertise search for a particular application-specific group of an alarm batch, the search component 210 can determine a preferred order of expert notifications based on the candidate experts' scores for the particular application type associated with the group.

Technical experts, system managers, and supervisors can access the GAAB system via user interfaces served by the system to the users' client devices (e.g., client devices 616 of FIG. 6) by user interface component 214. In some embodiments, the user interfaces may comprise hypertext transfer protocol (HTTP) interfaces delivered to the client devices by the cloud platform services. The user interface can include screens for entering expert-level data (e.g., the data recorded in the data record illustrated in FIG. 11), notification screens for providing information about a detected alarm event, acknowledgment screens for acknowledging alarm events or confirming that reworking of an alarm is approved, screens for entering customer contract information, and other such interface screens. The user interface can also include screens that allow the user to query the data storage areas of the GAAB system for alarm information, including but not limited to alarm statuses, a history of service for a given alarm or expert, alarm statistics for a selected production area or machine, etc. Users can also query the system via the user interface for contact information for other experts, system managers, etc. Technical experts can also access technical documents maintained on cloud storage by the GAAB system in some embodiments.

In some embodiments, the GAAB system also allows a system manager to score the work performed in connection with an alarm event. In such embodiments, the system manager can log onto the system after completion of service and provide a score for the work performed. Based on the score received from the system manager's account, the system can update the score associated with the expert involved in providing the service. The score may be reflected in an overall score stored in the expert's record on expert database 930, or may be reflected in an application- or technology-specific score for the expert depending on the relevant application or technology associated with the alarm event. The user interface can also include a service report editing screen that allows an expert to prepare a report for a given service action, which can be stored with the application-level data in application-level database 916. The system manager can access this report to assist in determining a suitable score for the service provided, typically after acknowledging completion of the alarm event by accepting the completion notification (see FIG. 10).

Figure 12:
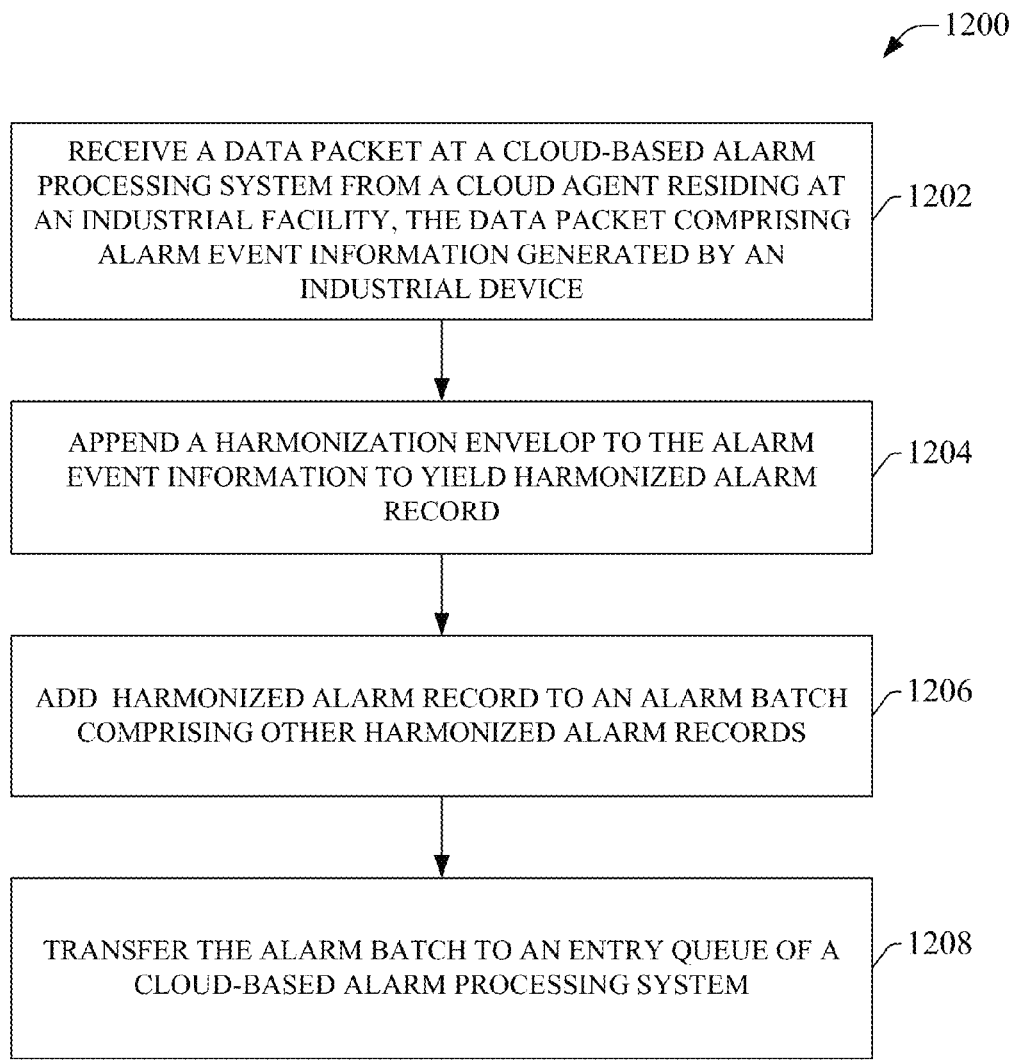
FIG. 12 is a flowchart of an example methodology for harmonizing alarm records received by a cloud-based alarm processing system from an on-premise cloud agent device.
Figure 13:
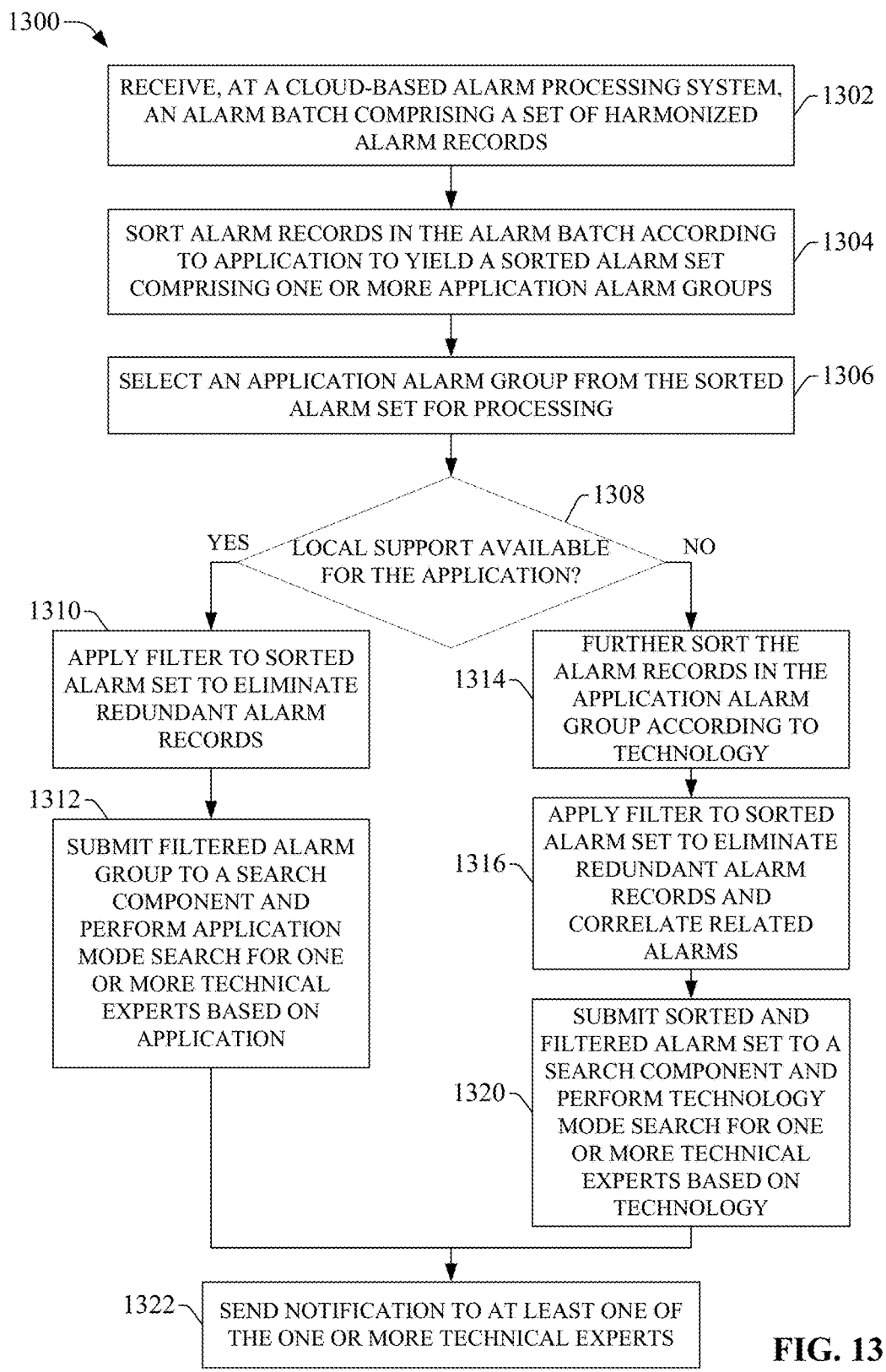
FIG. 13 is a flowchart of an example methodology for preparing an alarm batch for expertise matching by a cloud-based global alarm annunciation broker system.

FIGS. 12-14 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 12 illustrates an example methodology 1200 for harmonizing alarm records received by a cloud-based alarm processing system from an on-premise cloud agent device. Initially, at 1202, a data packet is received at a cloud platform from a cloud agent device residing at an industrial facility, the data packet comprising alarm event information generated by an industrial device at the facility. The alarm event information can be formatted by the cloud agent device to comprise a number of data fields, including an application identifier indicating an application or location of origin for the alarm, a description of the alarm, and a time-stamp indicating a time at which the alarm was generated. At 1204, a harmonization envelop is appended to the alarm event information to yield a harmonized alarm record. The harmonization envelop formats the alarm information according to a common schema that allows the cloud-based alarm processing system to process alarms in a consistent manner. For example, the harmonization envelop can include additional data fields required by the alarm processing system, including but not limited to a time zone of origin for the alarm, a technology to which the alarm relates, a status of the alarm, a mode, and a filter key.

At step 1206, the harmonized alarm record is added to an alarm batch comprising other harmonized alarm records. At 1208, the alarm batch is transferred to an entry queue of the cloud-based alarm processing system for further alarm processing.

FIG. 13 illustrates an example methodology 1300 for preparing an alarm batch for expertise matching by a cloud-based global alarm annunciation broker system. Initially, at 1302, an alarm batch comprising a set of harmonized alarm records is received at a cloud-based alarm processing system. The alarm batch can be prepared, for example, using methodology 1200 described above in connection with FIG. 12. At 1304, the alarm records in the alarm batch are sorted according to application to yield a sorted alarm set comprising one or more application alarm groups. For example, a worker role component of the broker system can execute a script that sorts the alarm records according to an Application ID field included in each of the harmonized alarm records. This results in multiple alarm groups, where each group is specific to a particular type of application that generated the alarm event (e.g., medium voltage drive alarms, advanced network alarms, etc.). At 1306, an application alarm group is selected from the alarm batch for the next phase of processing.

At 1308, a determination is made regarding whether the application type associated with the application alarm group can be addressed by a support entity that is local to the customer site at which the alarm was generated. For example, the system can determine whether local support for the identified application type is available based on application-level data stored on a cloud-based application database. This application-level data can define one or more local support entities, if available, for respective application types. If local support is available, the methodology moves to step 1310, where a filter is applied to the application-sorted alarm set to eliminate redundant alarm records. At 1312, the filtered alarm group is submitted to a search component and an application mode search is performed for one or more technical experts capable of assisting with alarms relating to the alarm set's application type. For example, the search component may select a set of relevant technical experts based on a search of a cloud-based expert database containing information about respective technical support experts. Information maintained in the expert database for each technical support expert can include, for example, areas of technology expertise, a time zone in which the expert resides, the expert's geographic location, current availability, and a score indicating a degree of expertise for a given type of application or technology. At 1320, a notification is sent to at least one of the one or more technical experts identified at step 1312. The notification can be sent to a client device associated with the technical expert (e.g., a mobile phone, a desktop/laptop/tablet computer, etc.), and can include information about the alarm events in the alarm set and the industrial entity (e.g., customer) requiring assistance with the alarm. In conjunction with the notification, the system can also generate a service ticket that tracks the service statuses of each alarm in the alarm set.

Alternatively, if it is determined at step 1308 that no local support is available, the methodology moves to step 1314, wherein the alarm records in the application alarm group are further sorted according to technology to yield one or more technology-sorted alarm groups. For example, the worker role component can execute a script that sorts the alarm records according to a Technology field included in each of the harmonized alarm records, where the Technology field indicates a technology to which the alarm event relates (e.g., a PLC alarm, an SQL alarm, etc.). At 1316, a filter is applied to the technology sorted alarm groups to eliminate redundant alarm records and to correlate related alarms within each group. At 1320, the sorted and filtered alarm set is submitted to the search component and, for each technology group of the set, a technology mode search is performed for one or more technical experts capable of assisting with alarms relating to the groups' technology and/or application types. At 1322, a notification is sent to at least one of the one or more technical experts identified at step 1322.

Figure 14A:
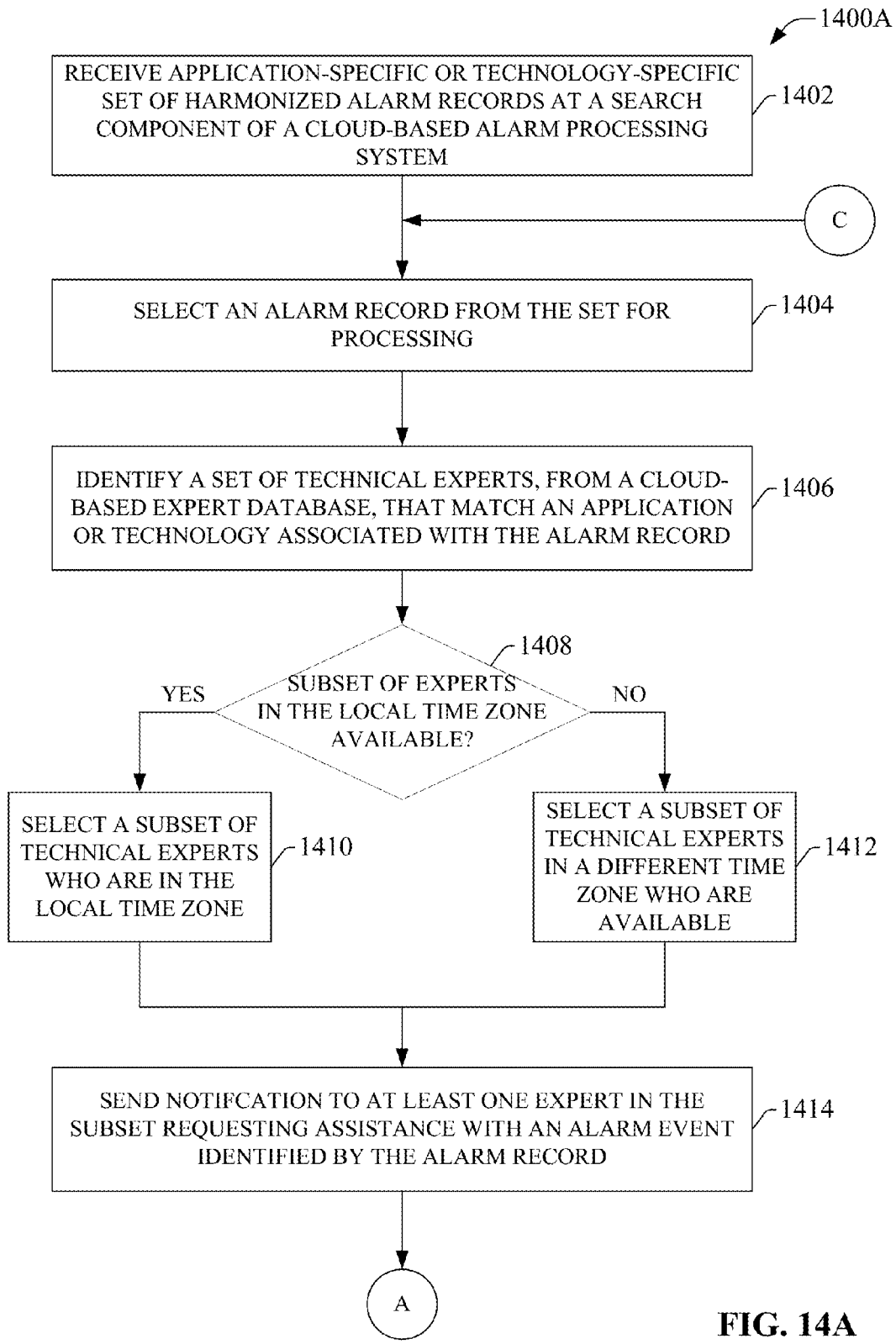
FIGS. 14A-14C are flowcharts of an example methodology for processing alarm events by a cloud-based alarm processing system.
Figure 14B:
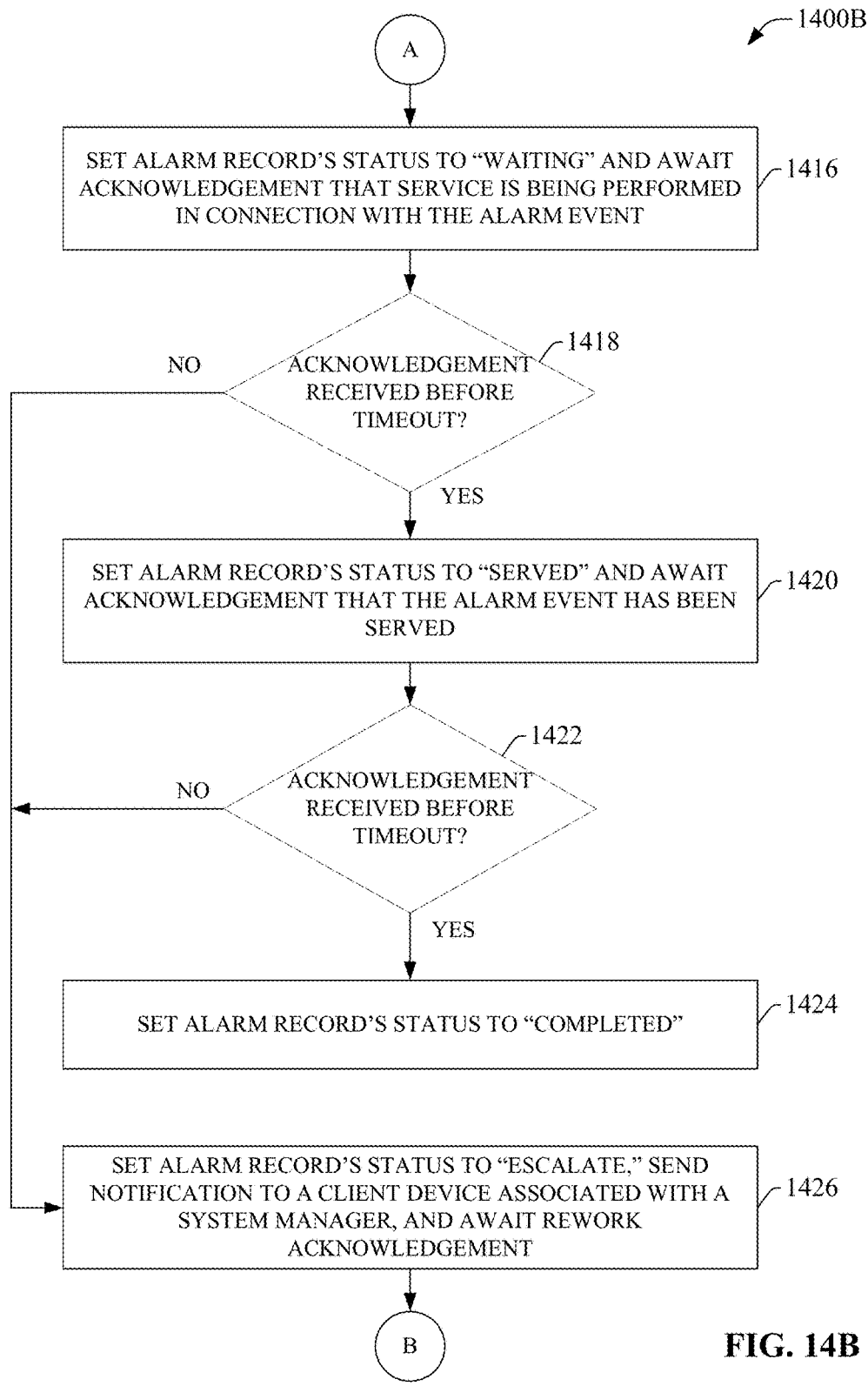
Figure 14C:
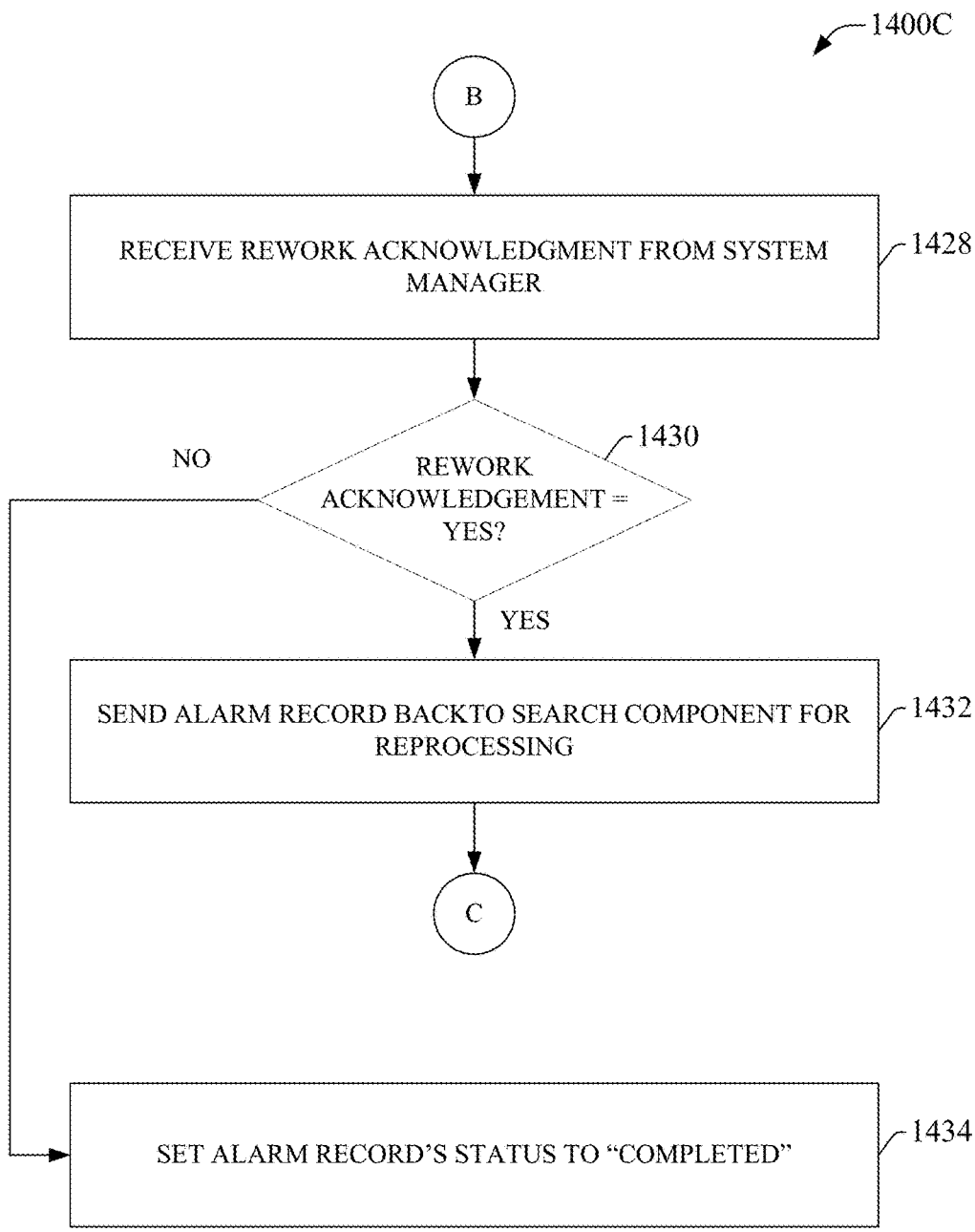

FIGS. 14A-14C illustrate an example methodology 1400 for processing alarm events by a cloud-based alarm processing system. Initially, at 1402, an application-specific or technology-specific group of harmonized alarm records is received by a search component of the cloud-based alarm processing system. The set of harmonized alarms can be generated, for example, using the technique outlined by methodology 1300 described above. At 1404, an alarm record is selected from the set for processing by the alarm processing system. At 1406, a set of technical experts are identified that match an application or a technology associated with the alarm record selected at step 1404. The set of technical experts can be selected, for example, from a cloud-based expert database that maintains information for a global pool of technical support experts (e.g., areas of technology expertise, time zones, geographic locations, current availability information, degree of expertise, etc.). For example, the set of experts may be selected by the system by comparing one or more of an alarm description field, Application ID field, or Technology field included in the alarm record with expert information associated with the respective experts defined in the expert database.

At 1408, a determination is made regarding whether the set of experts identified at step 1406 includes a subset of experts who are both available and located in the same time zone as the location of the alarm event identified by the alarm record. The alarm processing system can make this determination, for example, based on time zone and availability information for the respective experts maintained in the expert database. If a subset of available experts in the local time zone are identified, the methodology moves to step 1410, where the subset of the technical experts who are in the local time zone are selected. Alternatively, if no technical experts are found in the local time zone, or if all technical experts in the local time zone are currently unavailable, the methodology moves to step 1412, where a subset of available technical experts in a different time zone are selected from the set of experts identified at step 1406.

At 1414, a notification is sent to at least one expert in the subset selected at step 1410 or 1412, the notification requesting assistance with the alarm event identified by the alarm record.

The methodology continues in FIG. 14B. At 1416, the alarm record's status is set to Waiting, and the alarm processing system awaits acknowledgment that service is being performed in connection with the alarm event. The acknowledgment can be received, for example, via a user interface served to the expert's client device by the alarm processing system. At 1418, a determination is made regarding whether the acknowledgement was received before expiration of a timeout duration. If the acknowledgement that the alarm event is being serviced is received before expiration of the timeout duration, the methodology moves to step 1420, where the alarm record's status is set to Served, and the alarm processing system awaits acknowledgement that the alarm event has been served. Alternatively, if the acknowledgement is not received prior to expiration of the timeout, the methodology moves to step 1426, where the alarm record's status is set to Escalate, a notification is sent to a client device associated with a system manager indicating that a pending alarm has not received acknowledgement of service, and the system awaits receipt of a rework acknowledgement from the system manager.

If the alarm record has been placed in Served status at step 1420, a determination is made at step 1422 regarding whether an acknowledgment that the alarm event has been served was received prior to expiration of a timeout duration. This acknowledgement indicates that the notified expert has resolved the alarm event identified by the alarm record. If the acknowledgement is received before the timeout duration has expired, the methodology moves to step 1424, where the alarm record's status is set to Completed and the methodology ends. Alternatively, if the acknowledgement is not received prior to expiration of the timeout, the methodology moves to step 1426, where the alarm record's status is set to Escalate, the system manager is notified, and the alarm processing system awaits receipt of a rework acknowledgement from the system manager.

If the alarm record is placed in the Escalate state at step 1426, the methodology continues in FIG. 14C. At step 1428, the rework acknowledgement is received from the system manager. The rework acknowledgement is an indication of whether the system manager wishes the escalated alarm to be reprocessed or discarded. At 1430, a determination is made regarding whether the rework acknowledgement is a YES acknowledgement indicating that the system manager wishes to rework the alarm record. If the rework acknowledgement is a YES acknowledgement, the methodology moves to step 1432, where the alarm record is sent back to the search component for reprocessing. Alternatively, if the rework acknowledgement is a NO acknowledgment indicating that the system manager does not wish the alarm record to be reprocessed, the methodology moves to step 1434, where the alarm record's status is set to Completed and the methodology ends.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
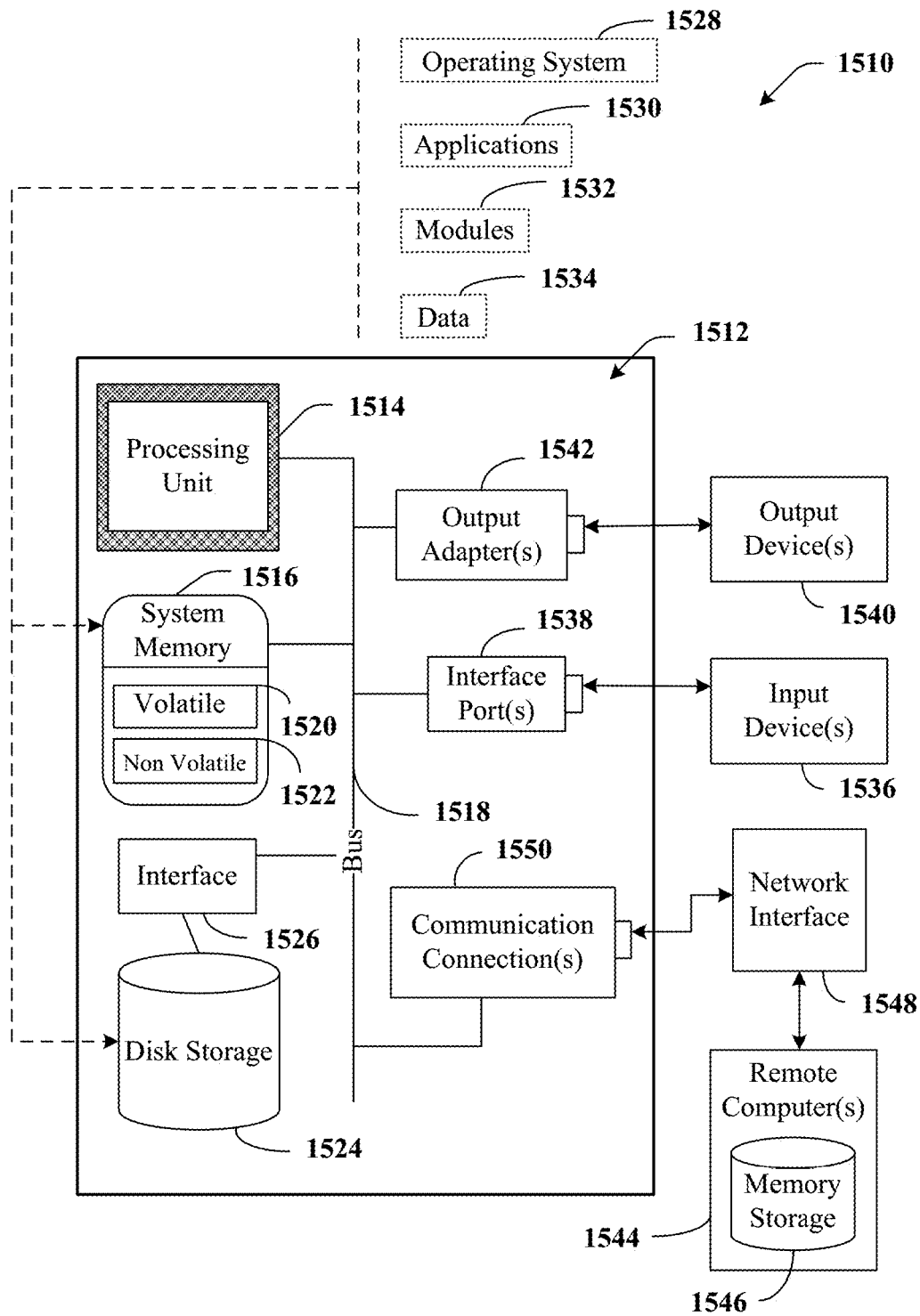
FIG. 15 is an example computing environment.
Figure 16:
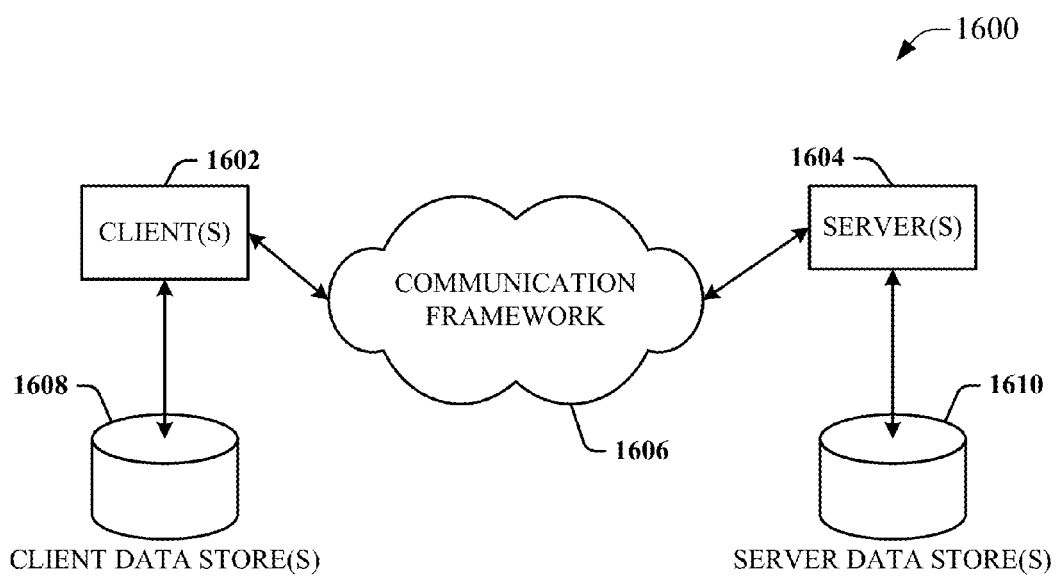
FIG. 16 is an example networking environment.

In order to provide a context for the various aspects of the disclosed subject matter, FIGS. 15 and 16 as well as the following discussion are intended to provide a brief, general description of a suitable environment in which the various aspects of the disclosed subject matter may be implemented.

With reference to FIG. 15, an example environment 1510 for implementing various aspects of the aforementioned subject matter includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Multi-core microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable PROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/nonvolatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer 1512. System applications 1530 take advantage of the management of resources by operating system 1528 through program modules 1532 and program data 1534 stored either in system memory 1516 or on disk storage 1524. It is to be appreciated that one or more embodiments of the subject disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapters 1542 are provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 2246 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the system bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample computing environment 1600 with which the disclosed subject matter can interact. The sample computing environment 1600 includes one or more client(s) 2302. The client(s) 1602 can be hardware and/or software (e.g., threads, processes, computing devices). The sample computing environment 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and servers 1604 can be in the form of a data packet adapted to be transmitted between two or more computer processes. The sample computing environment 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for notification of industrial alarm events, comprising:
 a memory that stores executable components;
 a processor, operatively coupled to the memory, that executes the executable components, the executable components comprising:
  a device interface configured to receive, at a cloud platform, a data packet from a cloud agent device, wherein the data packet comprises an alarm record identifying an alarm event associated with an industrial system;
  a worker role component configured to add the alarm record to an alarm batch comprising multiple alarm records and to sort the alarm batch according to application type to yield at least one application-specific alarm group;

a search component configured to identify a technical expert for at least one alarm record of an application-specific alarm group, of the at least one application-specific alarm group, based at least in part on an application type associated with the application-specific alarm group; and a user interface component configured to send, via the cloud platform notification information to a client device associated with the technical expert in accordance with a communication preference defined for the technical expert, the notification information requesting assistance in resolving at least one alarm event associated with the at least one alarm record.

2. The system of claim 1, further comprising a harmonization component configured to append harmonization data to the alarm record, wherein the harmonization data comprises at least one of time zone information indicating a time zone in which the alarm event originated, technology information indicating a technology to which the alarm event relates, status information indicating a current service status of the alarm event, mode information indicating a mode of the alarm event, or filter key information indicating a field of the alarm record to be used as a filter key for the alarm record.

3. The system of claim 1, wherein the user interface component is configured to send the notification information via at least one of a text messaging system, an email system, or a phone system.

4. The system of claim 1, wherein the user interface component defines a duration within which the technical expert is to address the at least one alarm event, and wherein the duration is based on a type of the at least one alarm event.

5. The system of claim 1, wherein the worker role component is further configured to determine whether a local support entity is available for the application type associated with the application-specific alarm group based on customer contract information maintained in an application data store, n response to determining that the local support entity is available, submit the application-specific alarm group to the search component, and in response to determining that the local support entity is not available, sort the application-specific alarm group according to technology type to yield at least one technology-specific alarm group, and submit the at least one technology-specific alarm group to the search component, wherein the search component is configured to identify the technical expert for at least one alarm record of a technology-specific alarm group, of the at least one technology-specific group, based at least in part on a technology type associated with the technology-specific alarm group.

6. The system of claim 1, wherein the worker role component is further configured to identify and delete redundant alarm records in the application-specific alarm group prior to submission to the search component.

7. The system of claim 5, wherein the worker role component is further configured to identify correlated alarm records in the technology-specific alarm group, select a representative alarm record of the correlated alarm records, set a first mode field of the representative alarm record to identify the representative alarm record as a master alarm, and set second mode fields of a remainder of the correlated alarm records that are not the representative alarm record to identify the remainder of the correlated alarm records as subordinate alarm records of the representative alarm record, wherein the search component is configured to perform a collective search for technical experts for the correlated alarm records based on the first mode field and the second mode fields.

8. The system of claim 1, wherein the search component is further configured to identify the technical expert based on expert data maintained in an expert data store, and wherein the expert data for a given technical expert comprises at least one of an application of technical expertise, a technology of technical expertise, a time zone in which the technical expert is located, a geographic location in which the technical expert is located, a present or future availability of the technical expert, or a score indicating a degree of expertise for an application or a technology.

9. The system of claim 8, wherein the user interface component is further configured to send a scheduling interface to a client device associated with the technical expert and to receive information regarding present and future availability of the technical expert via the scheduling interface.

10. The system of claim 1, wherein the user interface component is further configured to, in response to a determination by the worker role component that an acknowledgement of the at least one alarm record has not been received from the technical expert, send another notification to another client device associated with a designated system manager or supervisor.

11. A method for matching industrial alarm events with technical experts, comprising:

receiving, at a cloud platform by a system comprising at least one processor, a data packet from a cloud agent device that monitors an industrial process, wherein the data packet comprises an alarm record that identifies an alarm event associated with the industrial process;

collecting, by the system, multiple alarm records, including the alarm record, into an alarm batch;

sorting, by the system, the multiple alarm records of the alarm batch according to application type to yield application-specific alarm sets;

identifying, by the system, a subset of technical experts defined in an expert data store to be notified of one or more alarm events defined by an application-specific alarm set, of the application-specific alarm sets, based at least in part on a comparison of an application type associated with the application-specific alarm set with expert data stored in the expert data store; and sending, by the system, notification data to one or more client devices associated with the subset of technical experts in accordance with respective communication preferences defined for the subset of technical experts, wherein the notification data comprises a request for support in connection with the one or more alarm events defined by the alarm records of the application-specific alarm set.

12. The method of claim 11, further comprising, in response to the receiving, adding harmonization data to the alarm record, wherein the harmonization data comprises at least one of time zone information indicating a time zone in which the alarm event originated, technology information indicating a technology to which the alarm event relates, status information indicating a current service status of the alarm event, mode information indicating a mode of the alarm event, or filter key information indicating a field of the alarm record to be used as a filter key for the alarm record.

13. The method of claim 11, wherein the sending comprises sending the notification data via at least one of a text messaging system, an email system, or a phone system.

14. The method of claim 11, further comprising setting a time-of-service window defining a duration within which at least one of the subset of technical experts are to address the one or more alarm events, wherein the setting comprises setting the duration based on a type of the one or more alarm events defined by the alarm records.

15. The method of claim 11, further comprising:
referencing customer contract information stored in an application data store;
determining whether a local support entity is available for the application type associated with the application-specific alarm set based on the customer contract information;
in response to determining that the local support entity is available, submitting the application-specific alarm set to a search component that performs the identifying; and
in response to determining that the local support entity is not available,
sorting the application-specific alarm set according to technology type to yield technology-specific alarm sets;
submitting the technology-specific alarm sets to the search component; and
identifying a technical expert, of the technical experts defined in an expert data store, for at least one alarm record of one of the technology-specific alarm sets based at least in part on a technology type associated with the one of the technology-specific alarm sets.

16. The method of claim 15, further comprising:
identifying related alarm records in a technology-specific alarm set of the technology- specific alarm sets;
selecting a representative alarm record of the related alarm records;
setting a value of a first mode field of the representative alarm record to specify that the representative alarm record is a master alarm;
setting values of respective second mode fields of a remainder of the related alarm records that are not the representative alarm record to specify that the remainder of the related alarm records are subordinate to the representative alarm record; and
performing a collective search for technical experts for the related alarm records based on the first mode field and the second mode fields.

17. The method of claim 11, further comprising storing, as the expert data for at least one technical expert of the subset of technical experts, at least one of an application of technical expertise, a technology of technical expertise, a time zone in which the at least one technical expert is located, a geographic location in which the at least one technical expert is located, a present or future availability of the least one technical expert, or a score indicating a degree of expertise for an application or a technology.

18. The method of claim 17, further comprising:
sending a scheduling interface to a client device associated with the at least one technical expert;
receiving schedule information via the scheduling interface defining times that the at least one technical expert will be available to service alarm events; and
updating the expert data based on the scheduling information.

19. A non-transitory computer-readable medium having stored thereon instructions that, in response to execution, cause a system comprising a processor to perform operations, the operations comprising:
receiving, at a cloud platform, an alarm record from a cloud agent device that monitors alarm events at an industrial facility, wherein the alarm record identifies an alarm event associated with an industrial device;
adding the alarm record to an alarm batch comprising multiple alarm records;
sorting the alarm batch according to application type to yield at least one application- specific alarm group;
searching expert data maintained in cloud-based expert data storage based on an application-specific alarm group of the at least one application-specific alarm groups, wherein the expert data comprises information relating to a set of technical experts;
identifying, based on a result of the searching, a subset of the technical experts determined to be capable of assisting with one or more alarm events identified by one or more alarm records defined in the application-specific alarm group based on a comparison of the expert data with an application type associated with the application-specific alarm group; and
sending, via the cloud platform, notification information to one or more client devices associated with the subset of the technical experts in accordance with respective communication preferences defined for the subset of the technical experts, wherein the notification information comprises a request for assistance in resolving the one or more alarm events.

20. The non-transitory computer-readable medium of claim 19, wherein the alarm record comprises a first set of data fields, and the operations further comprise appending a second set of data fields to the alarm record to yield a harmonized data record, wherein the second set of data fields comprises at least one of a time zone field indicating a time zone in which the alarm event originated, a technology field indicating a technology to which the alarm event relates, a status field indicating a current service status of the alarm event, a mode field indicating a mode of the alarm event, or a filter key field indicating one of the first set of fields or the second set of fields to be used as a filter key for the alarm record.

* * * * *